(12) United States Patent
Wang et al.

(10) Patent No.: US 7,777,363 B2
(45) Date of Patent: Aug. 17, 2010

(54) WIND ENGINE AND WIND POWER SYSTEM

(76) Inventors: Ying Wang, Rm. 1802, 20th Bldg., Cuiyuan Xincun 5th Area, West Lake District, Hangzhou (CN) 310012; Qingwan Lin, Rm. 1802, 20th Bldg., Cuiyuan Xincun 5th Area, West Lake District, Hangzhou (CN) 310012

( * ) Notice: Subject to any disclaimer, the term of this patent is extended or adjusted under 35 U.S.C. 154(b) by 0 days.

(21) Appl. No.: 12/580,621

(22) Filed: Oct. 16, 2009

(65) Prior Publication Data

US 2010/0109337 A1 May 6, 2010

Related U.S. Application Data

(63) Continuation of application No. PCT/CN2007/001225, filed on Apr. 16, 2007.

(51) Int. Cl.
*F03D 1/02* (2006.01)
*F03D 9/00* (2006.01)
(52) U.S. Cl. .............. 290/55; 290/44; 415/905
(58) Field of Classification Search .......... 290/43, 290/44, 54, 55; 415/905, 2.1, 4.2
See application file for complete search history.

(56) References Cited

U.S. PATENT DOCUMENTS

| | | | | |
|---|---|---|---|---|
| 4,220,870 A | * | 9/1980 | Kelly ................... | 290/44 |
| 4,926,061 A | * | 5/1990 | Arreola, Jr. ................... | 290/55 |
| 5,394,016 A | * | 2/1995 | Hickey ................... | 290/55 |
| 6,097,104 A | * | 8/2000 | Russell ................... | 290/54 |
| 6,765,309 B2 | * | 7/2004 | Tallal et al. ................... | 290/55 |
| 7,154,190 B2 | * | 12/2006 | Kaploun ................... | 290/43 |
| 7,215,037 B2 | * | 5/2007 | Scalzi ................... | 290/55 |
| 7,230,348 B2 | * | 6/2007 | Poole ................... | 290/55 |
| 7,528,498 B2 | * | 5/2009 | Yeh ................... | 290/55 |
| 7,552,589 B2 | * | 6/2009 | Mok ................... | 60/641.15 |

* cited by examiner

*Primary Examiner*—Nicholas Ponomarenko
(74) *Attorney, Agent, or Firm*—Matthias Scholl P.C.; Matthias Scholl

(57) ABSTRACT

A wind engine has at least a central rotor (1) which has several groups of frameworks evenly distributed around it (2), each of the frameworks is provided with at least one set of power generation parts (3); the profile frame for the power generation parts is provided with a reversing and return booster (3g) for controlling the reversing speed, and each group of the frameworks is provided with a driver (8) and an opening adjustment positioner (7), and the brake releases or limits the reversing of the power generation parts by making or breaking the control circuit of the power distributor (21). The wind engine enables the power generation system to operate continuously and stably to generate power within the set varying range of different wind speed parameters and can improve power generation efficiency.

20 Claims, 15 Drawing Sheets

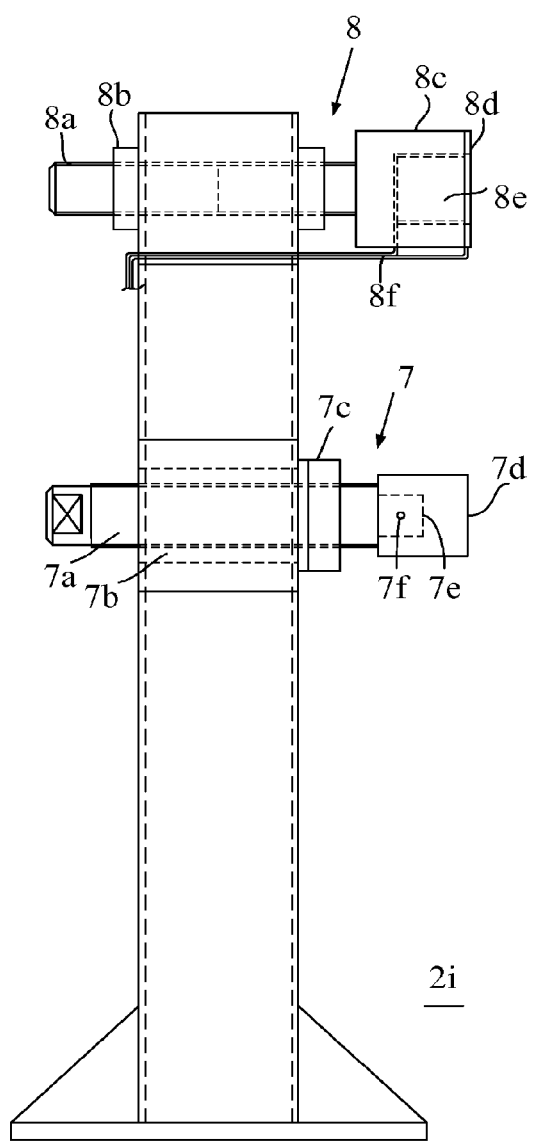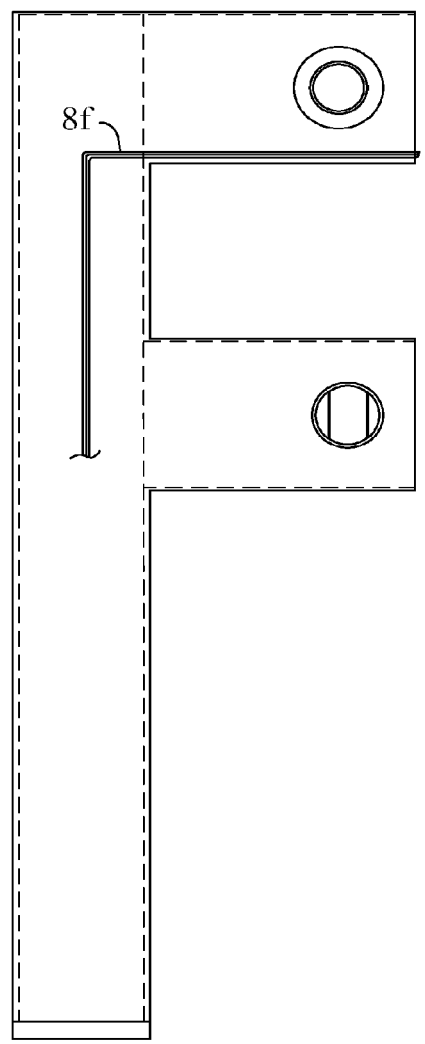
FIG.15                    FIG.16

WIND ENGINE AND WIND POWER SYSTEM

CROSS-REFERENCE TO RELATED APPLICATIONS

This application is a continuation of International Patent Application No. PCT/CN2007/001225, with an international filing date of Apr. 16, 2007, designating the United States, now pending. The contents of these specifications, including any intervening amendments thereto, are incorporated herein by reference.

BACKGROUND OF THE INVENTION

1. Field of the Invention

The invention relates to the technical and equipment field of utilizing wind energy to generate and output power and electric energy, and more particularly to a wind engine, wind power system, and wind power generation system.

2. Description of the Related Art

The internationally known and used wind turbine generator systems (WTGS) generally have a design in which three blades are assembled in an impeller and a drive shaft and are coupled to a gear box to drive a motor. For this type of wind turbine to meet the requirement for higher power output, the larger its blades, the higher the material strength and manufacture technical and bottleneck; since it is necessary to drive a large load immediately following startup, there should be a sufficient large torque; therefore the wind farm of such system shall be located in an area that has a strong wind force to achieve the conditions necessary for operation, and this is the key factor of the difficulty in wide application of wind power generation.

The wind speed necessary for normal operation and power generation of such wind turbines is about 10-22 m/s and lower wind speed will lead to lower power generation efficiency; however, if the wind speed exceeds 25 m/s, the wind turbine shall be cut out of work or the generator unit may be damaged; therefore, it has a narrower usable wind speed range, and the wind turbine has a lower efficiency because the system will not operate to generate power when the wind is weak or when there is no wind more often than not. In addition, it needs an energy-consuming wind direction tracking and navigation unit, which reduces the efficiency of the wind turbine; furthermore, the wind farm for such wind turbines occupies a wide area of land, which wastes land resources. To capture a stronger wind force, one independent huge tower each for a wind turbine is a costly waste, and the maintenance is difficult and costly as well; more over, its large rotating blades are fatal killers to numerous birds, causing another dangerous ecological disaster.

BRIEF SUMMARY OF THE INVENTION

In view of the above-described problems, it is one objective of the invention to provide a wind engine and its wind power system and wind power generation system integrating new technical concept and components to solve the above-mentioned wind turbine and wind farm problems, and pursues a technical system that is a perfect combination of power and power generation to relieve the grave situation of scare mineral energy and to gradually replace the existing thermal power plants to become the mainstream electric energy supply model, and meanwhile to relieve or even eliminate pollution and damage to the ecologic environment of the earth, promote the wide use of wind energy power generation, and achieve the ideal purpose of creating a sound economic and social environment of the world featuring sustainable, good and healthy development.

To achieve the above objective, in accordance with one embodiment of the invention, provided is a wind engine, comprising a vertically positioned central rotor; a power generation part; an opening adjustment positioner; a brake; a power distributor; a power switch, the vertically positioned central rotor has one unit of several groups of frameworks evenly distributed around it, or has at least two units of several groups of frameworks distributed longitudinally and consecutively along its length; each group of the frameworks is provided with at least one set of the power generation parts which can turn within a set range; a profile frame of the power generation parts has support shafts 3c of the same horizontal central line each positioned at ½ or ⅖ to ⅗ of the longitudinal height of the left and right side frames, and are installed with a bearing 3d onto the left and right columns 2c, 2d of the corresponding frameworks 2, to form a structure which is centered around the support shaft and can adapt to the wind direction changes, so that during the reversing wind stroke it will automatically reverse to be in a state where its entire plane is almost horizontal to the air flow direction without any air flow resistance, and during the fair wind stroke it will automatically return to a closed vertical state where it bears the pushing force perpendicular to the air flow, thereby driving the rotation of the entire system to form a wind engine; a bottom frame of the profile frame 3a has a set of reversing and return boosters 3g installed on one side that assists the power generation parts to reverse and lift and controls the reversing speed in case of a high wind speed; at columns 2c, 2d side of all groups of frameworks 2, there is the brake 8 for the power generation parts 3 for controlling the operation or stop of the wind engine and the opening adjustment positioner 7 for limiting the lifting angle of the power generation parts mounted on an integrated assembly bracket 2i; the brake 8 is electrically connected to the power distributor 21 installed on the lower shaft part 1f or upper shaft part 1e of the central rotor 1 via conductor or cable, and can control the make/break of the circuit via the power switch 22 of the power distributor 21, so that the brake 8 can release or limit the reversing of the power generation parts.

In a class of this embodiment, the central rotor 1 has, on its upper end, a shaft part 1b for accepting a bearing and a shaft part 1d for accepting a clutch 5 or coupler 6 or a shaft part 1e for accepting a power distributor, and has, on its lower end, a shaft part 1a for accepting a bearing 4 and a shaft part 1c for accepting a clutch 5, coupler 6 or gear or a shaft part 1f for accepting a power distributor; the central rotor 1 has a main body that is made of steel pipe or other appropriate material and has, at several locations as appropriate around it along its longitudinal direction, screw holes or through-holes for mounting the frameworks 2, the shaft parts 1a, 1b at both ends are respectively inserted and welded into both ends of the steel pipe of the main body and are processed by concentric fine machining; and the wind engine can be vertically installed with the bearings 4 mounted on the upper and lower end shaft parts 1b, 1a of the central rotor 1 onto the lower mounting rack B5 and the upper mounting rack B6 of the support construction B.

In a class of this embodiment, each group of the frameworks 2 comprises the columns 2c, 2d, upper beam 2a, lower beam 2b, diagonal bracing rod 2e, fixed mounting plate 2f and integrated assembly bracket 2i that are assembled altogether by welding, or are sub-assembled by means of fasteners and are assembled altogether by welding; in the design of two or more than two units of several groups of frameworks 2, the middle beams or each beam between the upper and lower beam are common beams 2g; the columns, beams and common beams are made of steel pipes or other appropriate material; and there is one reinforcing ring 2h for fixing frameworks for each of the upper beam and the lower beam in the proximity of the periphery of the bottom surface; the integrated assembly bracket 2i is formed by square steel pipes of a certain length which are individually welded to a set location on one side of the columns 2c, 2d and has a brake 8 for a group of power generation parts and an opening adjustment positioner 7 that are respectively mounted on two locations close to its end, the two locations are close to a positioning block 3f and respectively correspond to the lower positions of the two sides of the profile frame 3a; and the frameworks are vertically fitted onto the corresponding central rotor 1 via the through-holes 2j in the fixed mounting plate 2f by bolts or are appropriately welded after such fitting.

In a class of this embodiment, the power generation parts 3 has a profile frame 3a fabricated with steel pipe or other appropriate material by welding, one side serves as a closed wind force-bearing plane that is made of steel sheet 3b airtightly welded around the profile frame, or is formed with glass fiber reinforced resin, the internal area on the front face of the profile frame forms a wind-gathering concave shape which has along its longitudinal and transverse directions several areas separated by a plurality of divider plates 3e, and there is a positioning block 3f on the lower end of each of the two bottom frames of the profile frame, and one support shaft 3c of the same horizontal central line each is installed at ½ or ⅖ to ⅗ of the longitudinal height of the left and right side frames of the profile frame and is provided with a bearing 3d to mount the power generation parts 3 onto the frameworks 2 via bolt through-holes 2k by bolts; and on one side of the bottom frame of profile frame 3a, seen from the fair wind direction, there is a group of reversing and return booster 3g on the front of the bottom frame, which comprises a wind force-bearing wind pressure plate 3g-1 with its top side perpendicularly fixed onto the bottom frame of the profile frame 3a by use of a hinge or pivot, the pivot seat or bearing 3g-2 can be rotated in a single direction.

In a class of this embodiment, the composition of the power distributor 21 and its power switch 22 is: the power distributor 21 has an insulator ring 21a along the outer annulus of which there are two grooves properly isolated from each other, and the two grooves each has a conducting rail 21b in it, the conducting rails are electrically connected to the conducting wires 21e, and are also electrically connected to the conducting wires 8f of the field coil of the power generation parts brake 8; the insulator ring 21a is slipped onto the shaft part 1e or 1f by its central hole 21c and fixed to the shaft part with the key groove 21d, keys and screws; the power switch 22 has two mutually isolated power distributor grooves for operating the conducting carbon brushes 22a which enter the conducting rails 21b, and the two conducting carbon brushes are respectively electrically connected to the conducting wires 22i for switching on the power supply; the two conducting carbon brushes are respectively installed in a bracket 22c of an insulation kit 22b, both ends of the bracket are provided with a slide-supporting guide rod 22d and are respectively loaded with a compression spring 22h, the guide rod is slidingly inserted into the slide bearing 22e and the through-hole 22j that are fixed onto a support 22f, an operating lever 22k is installed in the middle of the bracket with its outside end passing through the through-hole of the support and is provided with a ball-shaped handle 22l, and each of the upper and lower positioning points located on the operating lever at a certain interval has a positioning pin 22m, 22n which is 90° from each other; and if the power switch is operated in automatic mode, the ball-shaped handle is changed to connect to a cylinder, and is connected to a secondary pressure reservoir cylinder tank with a pneumatic tube and is also electrically connected to an automatic control system E.

In a class of this embodiment, the brake 8 of the power generation parts has a screw 8a which can be inserted in a sliding fit into the integrated assembly bracket 2i and be fixed with two upper and lower nuts 8b, under the screw is an enclosure 8c whose internal space is provided with a core and field coil group 8e which is used to generate magnetic force and is fixed with an iron piece 8d, the conducting wire 8f of the field coil is electrically connected to the conducting wire 21e of the power distributor 21; the opening adjustment positioner 7 of the power generation parts has a screw 7a which is rotationally and vertically adjustable screwed onto a nut socket 7b fixed into the integrated assembly bracket 2i by use of a nut 7c, and the shaft part 7e on the lower end of the screw is provided with an elastor or buffer 7d for absorbing impact force, which can be connected by screws and fixed with a latch.

A wind power system, comprising: a support construction B; a higher level part H; and a lower level part L; the support construction B of a high frame structure or steel structure with a certain total height, total area and at least one level of space b to multiple levels of space b1~bn is formed based on the actual needs of the system, the higher level part H, i.e. the at least one level of space b to multiple levels of space b1-bn above a set height level, has a certain height and area matching the necessary height of the installed wind engine AP; in the lower level part L, there is at least one to multiple floors that are installed with energy-consuming equipment for industrial production and a processing equipment O or a liquid pump Q and a pneumatic motor M or a turbine J for supplying power, and the pneumatic motor and turbine can be connected to and drives the processing equipment or liquid pump via a throttle valve 14 or a pressure regulating valve 15 or via a gear shift mechanism or a power transmission group which can control the revolution speed; in the higher level part H of the support construction B, a group is formed by at least 3 levels of space b, the middle level is provided with an air compressor C, a pressure reservoir cylinder tank I, a power transmission group 10, a secondary power transmission group 10-1 and an automatic control system E; the wind engines AP installed in the upper and lower levels are coupled individually by their central rotors to the power transmission group 10 or vertical drive shaft 9 installed in the middle level via a clutch 5 or a coupler 6, to form a unit of wind engines 2AP, and are also coupled to and drive their respective at least one or more air compressors C through at least one or more power transmission groups 10 and secondary power transmission groups 10-1 containing the clutch 5; alternatively, in the higher level part H of the support construction B, a group is formed by 5 levels of space, the middle level is provided with an air compressor, a pressure reservoir cylinder tank, a power transmission group, a secondary power transmission group and the automatic control system; the upper two levels and the lower two levels are respectively installed with at least one wind engine AP located in the same vertical central axial line S; the adjacent wind engines in the upper two levels and lower two levels are respectively connected in serial through the shaft part of their central rotors via a coupler or clutch, to form one unit of wind engines 2AP, and are then coupled to the vertical drive shaft 9 through a clutch or coupler to form 2 units of wind engines 4AP with higher power output, and they are then individually coupled to and drive their respective at least one or more air compressors C by use of at least one or more power transmission groups and secondary power transmission groups containing a clutch; alternatively, in the higher level part H of the support construction, at least one level of space is provided with at least one wind engine AP, and the adjacent levels are provided with an air compressor, a pressure reservoir cylinder tank, a power transmission group, a secondary power transmission group and the automatic control system E; the wind engine is coupled to the vertical drive shaft 9 via a coupler or clutch, and is coupled to and drives their respective at least one or more air compressors C through at least one or more power transmission groups and secondary power transmission groups containing the clutch; by means of piping 18 connected with a check valve 16, a gate valve 17 or a valve, the air compressor C accumulates the generated high pressure compressed air in at least one or more pressure reservoir cylinder tanks I connected, and is also connected to a pneumatic motor M or turbine J supplying power for industrial production and processing equipment by means of piping 18 connected with a magnetic control valve 13, a throttle valve 14 and/or a pressure regulating valve 15; combined with the automatic control system E installed to select and control the set functions, the system has its characteristic functions controlled as follows:

a. by adding or reducing the number of the operating air compressors C, the wind engine AP or wind engines 2AP or 4AP are adjusted so that they can maintain the normal, stable and correct operation state even when the wind is at different speeds;

b. when the natural wind speed maintains at the normal set values within certain varying range, the wind engine or wind engines 2AP or 4AP drive the main air compressor to operate; and meanwhile, the automatic control system adjusts the high-pressure air output of the pressure reservoir cylinder tank I according to the operation conditions of the pneumatic motor or turbine which supplies power to the production and processing equipment O or liquid pump Q or according to the actual high-pressure air output; when the liquid pump or industrial processing equipment is stopped, the magnetic control valve or throttle valve can be used to turn off the high-pressure air output so as to stop the operation of the pneumatic motor or turbine;

c. when the wind speed changes so greatly that it exceeds the set value range or the revolution speed of the wind engine or wind engines exceeds the set normal revolution range, the automatic control system can control and select the number of air compressors to be added and put them into operation according to the change amplitude of wind speed strength or the set revolution parameter values of the wind engine so as to control and adjust the wind engine or wind engines to maintain its ideal and stable operation state under varying wind speed conditions; after an air compressor receives the command of starting operation, the clutch of the power transmission group that is coupled to it will automatically engage, the air compressor will start operation and the high-pressure air will be accumulated in the pressure reservoir cylinder tank;

d. when the wind speed or the revolution speed of the wind engine is lower than the set normal parameter range, the automatic control system will select and control the number of air compressors to be stopped according to the wind speed change or the parameter value of the revolution change range of the wind engine, and the clutch of the power transmission group of secondary power transmission group coupled to the vertical drive shaft corresponding to the air compressor receiving the stop command will disengage and stop operation immediately;

e. when the wind speed or the revolution speed of the wind engine cannot properly drive any air compressor to operate correctly, the clutch of the power transmission group coupled to the vertical drive shaft automatically disengages, and will automatically engage once the wind speed can drive the wind engine to work properly, and the power is output;

The above the is combined to become one unit of wind power system there may be a plurality of units of wind power systems in the higher level part H of the support construction B.

A wind power system, the support construction B of a high frame structure or steel structure with a certain total height, total area and multiple levels of space b1~bn is formed based on the actual needs of the system, the higher level part H, i.e. the at least one level b to multiple levels of space above a set height level, has a certain height and area matching the necessary height of the installed wind engine AP; in the higher level part H of the support construction, at least one level of space is provided with at least one wind engine AP; in the application where each of the multiple levels of space is provided with a wind engine, and they are serially connected by the shaft part of their respective central rotor 1 to each other by means of a clutch or coupler, and are connected to the upper end of the vertical drive shaft 9 via a clutch or coupler through the wind engine at the bottom, and furthermore, the lower end of the vertical drive shaft is coupled to and drives the energy-consuming equipment of the industrial production and processing equipment O or liquid pump Q by use of the power transmission group and/or gear shift mechanism; in the meantime, they are connected to their respective at least one or more air compressors C by parallel connection of the vertical drive shaft to at least one or more power transmission groups and secondary power transmission groups containing the clutch; the air compressor C accumulates the generated high-pressure air in at least one or more pressure reservoir cylinder tanks I via piping 18 connected with a check valve 16, a gate valve 17 or a valve, and is connected to the pneumatic motor M or turbine J supplying power to the industrial production and processing equipment through piping 18 connected with a magnetic control valve 13, a throttle valve 14 and/or a pressure regulating valve 15; the pneumatic motor or turbine is coupled to the power transmission group or gear shift mechanism via a clutch; combined with the automatic control system E installed to control the set functions, the system is controlled as follows:

a. by adding or reducing the number of the operating air compressors C, the wind engine AP or wind engines 2AP or 4AP are controlled so that they can maintain stable and correct operation state;

b. when the natural wind speed maintains at the normal set values within certain varying range, the equipment that is powered by the wind engine or wind engines maintains the normal and ideal operation state;

c. when the wind speed increases to the extent that it exceeds the set value range or the revolution speed of the wind engine or wind engines exceeds the set range, the automatic control system can control and select the number of air compressors to be put into operation according to the wind speed strength or the set revolution parameter values of the wind engine so as to control and adjust the wind engine or wind engines to maintain their ideal and stable operation states; once an air compressor receives the command of starting operation, the clutch of the power transmission group coupled to it will automatically engage, the air compressor will start operation and the high-pressure air will be accumulated in the pressure reservoir cylinder tank;

d. when the natural wind speed or the revolution speed of the wind engine is lower than the set value range, the clutch that connects the wind engine or wind engines to the vertical drive shaft or gear shift mechanism will automatically disengage, and meanwhile the magnetic control valve connected to the pneumatic motor or turbine corresponding to the energy-consuming equipment to be operated will automatically open so that the pneumatic motor or turbine starts operation, and the clutch that connects the pneumatic motor or turbine to the gear shift mechanism or power transmission group will engage, and the power is input to the energy-consuming equipment.

A wind power generation system, the support construction B of a high frame structure or steel structure with a certain total height, total area and at least one level b to multiple levels b1~bn of space is formed based on the actual needs of the system, the higher level part H, i.e. the at least one level b to multiple levels b1~bn of space above a set height level, has a certain height and area matching the necessary height of the installed wind engine AP; in the higher level part H of the support construction B, a group is formed by at least 3 levels of space b, the middle level is provided with a generator G, an air compressor C, a pressure reservoir cylinder tank I, a pneumatic motor M or turbine J, power transmission groups 10, 12, a secondary power transmission group 10-1 and an automatic control system E; the floor in the upper and lower levels are respectively provided with a wind engine AP which is serially connected by the upper and lower shaft parts of their respective central rotors 1 to the vertical drive shaft 9 in the middle level via a clutch 5 or coupler 6, to form one unit of wind engines 2AP, and furthermore, they are connected to and drive their respective at least one or more air compressors C by parallel connection of the vertical drive shaft to at least one or more power transmission groups and secondary power transmission groups containing the clutch; alternatively, in the higher level part H of the support construction B, a group is formed by 5 levels of space, the middle level is provided with a generator G, an air compressor C, a pressure reservoir cylinder tank I, a pneumatic motor M or turbine J, power transmission groups 10, 12, a secondary power transmission group 10-1 and an automatic control system E; the upper two levels and the lower two levels are respectively provided with at least one wind engine AP located in the same vertical central axial line S; the adjacent wind engines AP in the upper two levels and lower two levels are serially connected via a coupler 6 or clutch 5 through the shaft parts of their central rotors 1, to respectively form one unit of wind engines 2AP, and are then coupled to the vertical drive shaft 9 in the middle level through a clutch or coupler by means of the lower shaft parts of the central rotors of the wind engines in the upper level and the upper shaft parts of the wind engines in the lower level, to form two units of wind engines 4AP with higher power output; furthermore, they are connected in parallel to and drive their respective at least one or more air compressors C via at least one or more power transmission groups 10 and secondary power transmission groups 10-1 containing the clutch 5; alternatively, in the higher level part of the support construction, at least one level of space b is provided with at least one wind engine AP, and the adjacent levels are provided with an air compressor C, a pressure reservoir cylinder tank I, a pneumatic motor or turbine J, power transmission group 10, 12, a secondary power transmission group, a generator G and the automatic control system E; the wind engine is coupled to the vertical drive shaft 9 via a coupler or clutch, and is also connected in parallel to and drives their respective at least one or more air compressors C via at least one or more power transmission groups 10 and secondary power transmission groups 10-1 containing the clutch; through piping 18 connected with a check valve 16, a gate valve 17 or a valve, the air compressor C accumulates the generated high pressure compressed air in at least one or more pressure reservoir cylinder tank I connected to it, and is then connected to a pneumatic motor M or turbine J through piping 18 connected with a magnetic control valve 13, a throttle valve 14 and/or a pressure regulating valve 15, and is further connected to and drives the generator G to generate power via the power transmission group 12 or gear shift mechanism containing the clutch 5; the generator G and the wind engine AP are provided with a revolution sensor, all pressure reservoir cylinder tanks I or their piping is provided with a pressure sensor, and both the sensors are electrically connected to the automatic control system E; combined with the automatic control system E installed to control, select and adjust the set functions, the system has its characteristic functions controlled and regulated as follows:

a. by adding or reducing the number of the operating air compressors C, the wind engine AP or wind engines 2AP or 4AP is controlled to maintain the stable and correct operation state;

b. when the natural wind speed or the revolution speed of the wind engine AP or wind engines 2AP or 4AP maintains within the set normal optimal value range, the main air compressor C or a necessary number of air compressors is put into operation, the high-pressure air accumulates in the pressure reservoir cylinder tanks I, and the energy it generates is more than the energy consumed by the pneumatic motor M or turbine J; the pressure reservoir cylinder tanks that are full of high-pressure air of the air compressor are connected, the pressure reservoir cylinder tank which receives the command to open the valves 13, 14 and/or 15 outputs stably-regulated high-pressure air through the piping 18 connected with a control valve to drive the pneumatic motor M or turbine J to operate and drive the generator G to work stably to generate and output high-quality power;

c. when the wind speed changes so greatly that it exceeds the set normal value range or the revolution speed of the wind engine or wind engines exceeds the set normal revolution range, the automatic control system can control and select the number of air compressors to be put into operation according to the change amplitude of the wind speed strength or the set revolution parameter values of the wind engine or wind engines to control and adjust the wind engine AP or wind engines 2AP or 4AP and the generator G to maintain their correct and stable operation states; once an air compressor receives the command of starting operation, the clutch 5 of the secondary power transmission group 10-1 that connects to it will automatically engage, and power is transmitted to drive the air compressor to start operation and the high-pressure air will be accumulated in the pressure reservoir cylinder tank I;

d. when the wind speed decreases to lower than the set value range or the revolution speed of the wind engine is lower than the set normal value range, the automatic control system will select the number of air compressors to be stopped according to the set wind speed or the parameters of the revolution change range of the wind engine, so as to maintain normal operation of the wind engine or wind engines and air compressor; the clutch of the corresponding power transmission group coupled to the air compressor which receives the control command to stop operation will automatically disengage and the air compressor stops operation. If the wind engine or wind engines are in operation but without efficiency, the clutch 5 of the power transmission group 10 coupled to the vertical drive shaft 9 will automatically disengage and will engage again once the wind speed returns to normal, and the wind engine and the air compressor will continue normal operation; in case of stop of the wind engine and air compressor due to no wind or weak wind, the generator can still be stably driven to operate and generate power by the pneumatic motor or turbine whose power is supplied by the air pressure reservoir cylinder tank with sufficient high-pressure air; the forming one unit of wind power generation system may comprise setting many units of wind power generation systems in the higher level part H of the support construction B to output and supply power in combination with the power distribution and supply facilities N.

A wind power generation system, a support construction B of a high frame structure or steel structure with a certain total height, total area and at least one level of space b to multiple levels of space b1-bn is formed based on the actual needs of the system and can be divided into the higher level part H above a set height level and the lower level part L below a certain height level; the at least one level to multiple levels of space in the higher level part H has a certain height and area matching the necessary height of the installed wind engine AP.

In the higher level part H of the support construction B, a group is formed by at least 3 levels of space b, the middle level is provided with a generator G, an air compressor C, an air pressure reservoir cylinder tank I, a pneumatic motor M or turbine J, power transmission groups 10, 11, 12, a secondary power transmission group 10-1 and an automatic control system E; the space in the upper and lower levels are respectively provided with a wind engine AP which is connected to the vertical drive shaft 9 or power transmission group in the middle level via a clutch 5 or coupler 6 to form one unit of wind engines 2AP, and is coupled to and drives the generator G by means of the power transmission group 11 containing the clutch 5, and is also connected in parallel to and drives if necessary their respective at least one or more air compressors C via at least one or more power transmission groups 10 and secondary power transmission groups 10-1 containing the clutch 5.

Alternatively, in the higher level part H of the support construction B, a group is formed by 5 levels of space b, the middle level of which is provided with a generator G, an air compressor C, an air pressure reservoir cylinder tank I, a pneumatic motor M or turbine J, power transmission groups 10, 11, 12, a secondary power transmission group and an automatic control system E; the upper two levels and the lower two levels are respectively installed with at least one wind engine AP located in the same vertical central axial line S; the adjacent wind engines in the upper two levels and lower two levels are serially connected by the shaft parts of their central rotors 1 via a coupler or clutch to respectively form one unit of wind engines 2AP, and are then serially connected to the vertical drive shaft 9 through a clutch or coupler to form two units of wind engines 4AP with higher power output, and are further connected in parallel to their respective at least one or more air compressors C through at least one or more power transmission groups 10 and secondary power transmission groups 10-1 containing the clutch, and drive the operation if necessary and accumulate high-pressure air in the air pressure reservoir cylinder tanks I.

Alternatively, in the higher level part H of the support construction B, there is at least one level space that is provided with at least one wind engine AP, and the adjacent level is provided with a generator G, an air compressor C, an air pressure reservoir cylinder tank I, power transmission groups 10,11,12, a secondary power transmission group 10-1 and an automatic control system E, the wind engines are coupled to and drive the motor via a clutch 5 or coupler 6 and a vertical drive shaft 9 or power transmission group, and furthermore, they are connected in parallel to and drive if necessary their respective at least one or more air compressors C via at least one or more power transmission groups 10 and secondary power transmission groups 10-1 including the clutch.

The above-mentioned motor and wind engine are provided with a revolutions sensor and is electrically connected to the automatic control system.

The above-mentioned air compressors respectively accumulate the generated compressed air into at least one or more air pressure reservoir cylinder tank by means of a pipeline with a check valve, a gate valve or a valve, are connected to the pneumatic motor or turbine via a pipeline with a magnetic control valve, a throttle valve or/and a pressure regulating valve, and furthermore, if necessary they also receive commands from the automatic control system to be connected to and drive the generator to operate and generate power by means of the power transmission group 12 including the clutch; each air pressure reservoir cylinder tank or pipeline can also be provided with a pressure sensor and electrically connected to the automatic control system.

Combined with the automatic control system E installed to control, select and adjust the set functions, the system has its functions controlled as follows:

a. By adding or reducing the number of the operating air compressors C, the wind engine AP or wind engines 2AP or 4AP are controlled so that they can maintain normal, stable and correct operation states even at different wind speeds;

b. When the wind speed or the revolution speed of the wind engine maintains within the set normal value range, the wind engine or the wind engines 2AP or 4AP drive the generator G to operate and generate power;

c. When the wind speed is so high that it exceeds the set value range or the revolution speed of the wind engine or generator exceeds the set normal revolution range, the automatic control system can control and select to start one, two or more air compressors according to the wind speed strength or the set parameter value of the revolution change amplitude of the wind engine or generator so as to control and adjust the wind engine or generator to maintain their correct and stable operation state; once an air compressor receives the command of starting operation, the clutch of the power transmission group 10 coupled to it will automatically engage, the corresponding air compressor will start operation and the high-pressure air will be accumulated in the air pressure reservoir cylinder tanks I;

d. When the wind speed decreases to lower than the set value range or the revolution speed of the wind engine or engines or generator is lower than the set value range, the clutch 5 that connects the wind engine or engines to the power transmission group 11 of the generator will automatically disengage, and meanwhile, among the air pressure reservoir cylinder tanks I full of high-pressure compressed air indicated by the pressure sensor, the magnetic control valve 13 of the air pressure reservoir cylinder tank which receives the command to output high-pressure air will open and the high-pressure air flow is adjusted by the throttle valve 14 and/or pressure regulating valve 15 to achieve a proper flow and/or pressure so as to control the output power of the pneumatic motor M or turbine, and in the meantime, the clutch 5 of the power transmission group 12 connected to the pneumatic motor or turbine and generator G will automatically engage and the power output is maintained to drive the generator to continue operation, and to generate and output power;

e. When the wind speed returns to the set normal value range, the clutch of the power transmission group 11 will receive a command and will automatically engage, and meanwhile, the clutch of the power transmission group 12 is controlled to disengage, the magnetic control valve will receive a command and will automatically close so that the high-pressure air output is stopped, and the pneumatic motor or turbine stops operation, and the generator is driven to operate and generate power again by the wind engine or engines.

The above the is combined to become one unit of wind power generation system there may be a plurality of units of wind power generation systems in the higher level part H of the support construction B and they transmit and supply power in combination with the power distribution and supply facilities N.

In a class of this embodiment, the total height and area of the support construction B is planned, designed and built according to the necessary power or total power generation capacity, with the total height ranging from less than 100 m to over 100 m; the support construction is divided into two parts: the higher level part H that is above a certain height level, and the lower level part L that is below a certain height level, the "certain height" refers to a height ranging from about 40 m to 100 m; for the higher level part H, the number of levels of space b for installing wind engines AP, level height and area will depend upon the specifications or functional needs of the installed wind engines and the height of individual levels of space range from 3 m to 30 m; for the lower level part L, it is the base skeleton of the support construction B and can also be built into a usable multi-floor space and the floor height depends upon the actual applications and ranges from 3 m to 7 m.

For floors in the lower level part L, the top one or two floors are respectively configured with a system-wide automatic monitoring & control unit U, power transmission, distribution & supply facilities N, system maintenance equipment and facility V and rest room for management and duty persons W, and other lower floors are mainly configured with production & processing equipment O or economic operation facilities, and can also be planned to become a green, energy-saving and environment-friendly residence.

In a class of this embodiment, the higher level part H of the support construction B has levels separated by the floor F, and at a location that is substantially centered on the floor of each level and is in the same vertical central line S, there is a window 121B4, and furthermore, at this location, there are also a lower mounting rack B5 and an upper mounting rack B6 which are used for mounting the energy wind engine AP and can be installed onto the beam B2 or secondary beam.

Other than the column B1 and beam B2 structural skeleton of the support construction B, there is no fixed walls or other closed objects around each level of space b of the higher level part H, so air can flow freely everywhere, but there is a mobile or movable divider plate or shutter door B7 which can open/close either manually or automatically and can provide an enclosure in all four sides to block air flow or storm if necessary.

An anemometer or anemoscope K electrically connected to one or more automatic control systems E is provided on the outer side of one or more levels of space.

A dedicated large vertical elevator T is provided on one side of the support construction B.

In the higher level part of the support construction, around the floors of all or lower parts 1H, there are wind collecting and directing walls D for collecting the wind force which extend externally to several meters or tens of meters in several directions and are constructed of light bricks or boards in combination with frame structure, and there is no floor F within the distribution space of the walls, on the walls there may be solar photoelectric or light-heat energy conversion unit D2 and the electric energy generated is synchronized with and output to the power transmission, distribution and supply facilities N; a gale drainage door or window D3 is configured near the divider plate or shutter door inside the wind collecting and directing walls.

There is a roof at the top of the topmost level of the support construction B, which is provided with lightning protection facility and water storage tank.

The present invention has the following advantages:

1) the wind energy power engine of the present invention has a wide area to widely and effectively collect winds from different directions to optimally produce maximum rotation energy, and is made of material and structure that has excellent strength and is easy to process and build, and as it does not need a energy-consuming directional navigation unit and does not directly drive the generator to operate, the wind speed required for startup torque and cut-in operation is much lower;

2) with the technical feature of vertical integration of the wind energy power engines of the present invention, the system of the present invention combines a large scale of power so that it can use larger generators with higher power generation capacity to reduce the number of generators required, and the generators and all equipment are deployed in a free and open space where natural air can flow freely, resulting in good heat dissipation, long service life, easy maintenance and low resource consumption and cost;

3) the system of the present invention uses the technology of compressed air energy storage to store wind energy when the wind force is strong and to provide the stored energy for power generation when there is no wind. In this way, it increases the power generation time of the generators and maintains the normal operation and power generation quality of the generators;

4) with the compressed air energy storage technology, the system can control wind energy power engines and generators to maintain normal and stable operation when the wind is strong or when there is no wind, unlike the conventional wind turbine generator systems which must be cut out in case of strong wind, leading to low wind energy utilization and power generation efficiency, and will stop operation and power generation for a long period of time in case of weak wind or no wind;

5) the high elevation vertical integration technology is created to make the most of advantageous environment in the higher space, which saves a wide area of land resources while developing construction into higher space to make full use of the powerful air flow resources in the higher space so as to obtain a larger amount of electric energy; and 6) the support construction of the present invention has a well designed layout, the higher level part can make full use of rich wind energy resources in the higher space, and the lower level space L can be fully utilized by installing production and processing equipment, or can be used as an economic activity site or developed into an energy-saving and environment-friendly residence with energy self-sufficiency to maximize the benefits of resources.

BRIEF DESCRIPTION OF THE DRAWINGS

FIG. 15 is a front view showing the integrated assembly bracket 2i of the framework 2 of the wind energy power engine and the assembled state of the mounted opening adjustment positioner 7 and the brake 8 of the power generation parts;

FIG. 16 is a side view of that shown in FIG. 15;

DETAILED DESCRIPTION OF THE INVENTION

Figure 1:
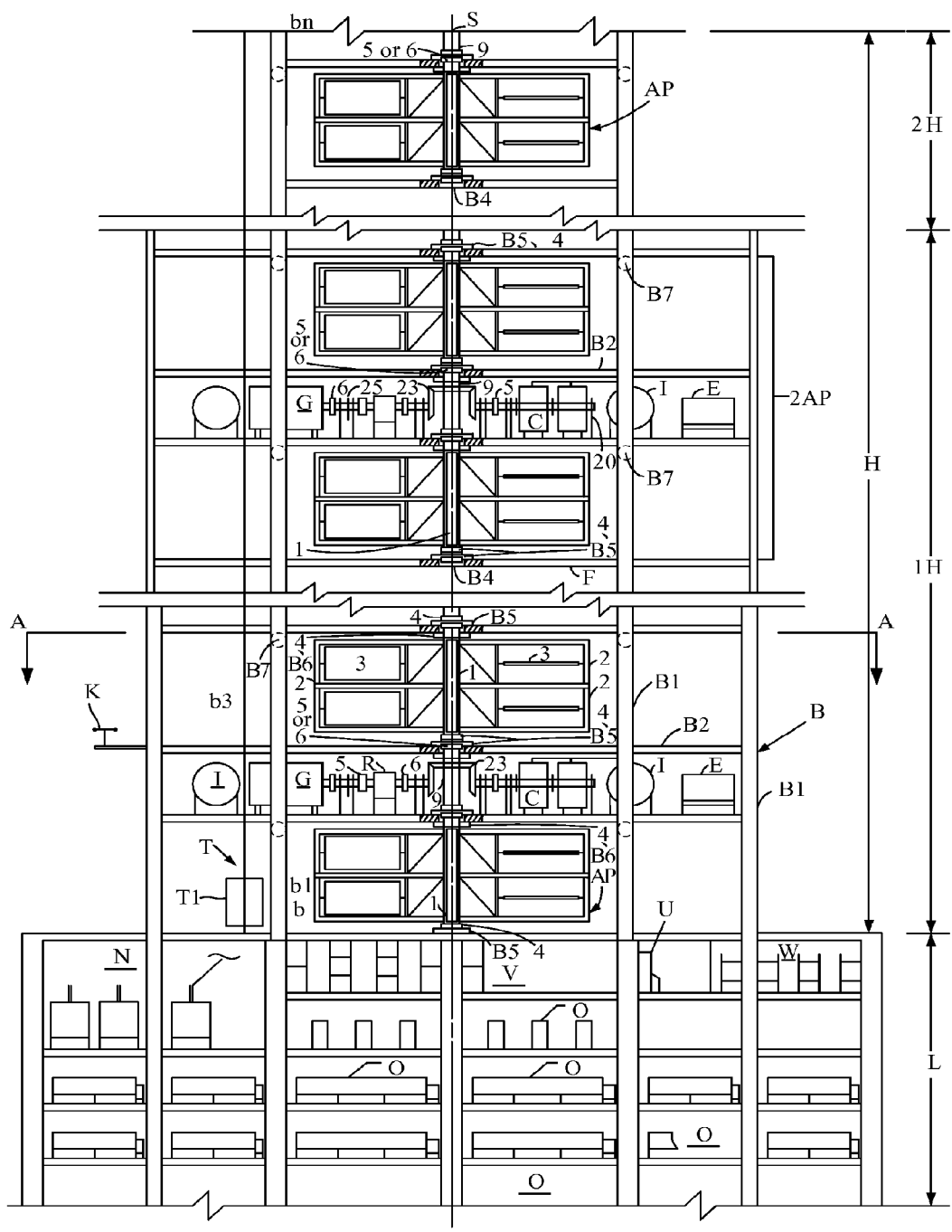
FIG. 1 is a main view of the wind energy power generating system of the present invention combining power generation and driving in one, comprising a power generator that is driven by the power from the wind engine and can also be driven the power from a stored energy power system that can regulate and balance the wind force actions for the wind energy power engine.

Further description of the present invention will be given in the following in combination with the drawings and embodiments:

First, please refer to FIG. 1, which shows the composition of the wind energy power generating system described in claim 10. This is a stored energy power system which uses a support construction B of special design to develop into higher space to vertically integrate individual wind energy power engines (AP) to form unit(s) of wind energy power engines (2AP or 4AP) so as to generate and output greater power to drive the generator of higher power generation capacity to operate and generate power, and which can adjust and balance the wind energy power engines at different wind speeds to maintain stable and normal operation and can also store the wind energy, and furthermore, if necessary, can replace the wind energy power engine to drive the generator to maintain continuous operation for power generation in case of no wind or weak wind.

The support construction B is a frame structure with column B1 and beam B2 as the skeleton, and is divided into the lower level part L and the higher level part H.

To collect stronger air flow resources in higher space, the support construction B is ideal to provide an appropriate means and carrier for expansion into the higher space to get unlimited energy. The wind energy power engine (AP) of the present invention is characterized in providing complete technical solutions. The total height and total area of the support construction is planned, designed and built according to the power generation capacity of the power generating system and the natural climate conditions of the region. For example, for an inland city which is outside a costal area with strong wind, the height of the support construction for a power generation capacity of 100,000 KW is about 200 m to 300 m, and it uses a land area of about 4,000 to 9,000 square meters.

The lower level part L mainly serves as a basic height foundation required for the wind energy power engine (AP) in the higher level part H to collect air flows of sufficient strengths; therefore its height depends on the actual needs. Normally, in a city located in a non-strong wind area, the height of the lower level part is about 40 m to 100 m. Considering the shock-resistant performance and load safety of the support construction B, the lower level part shall have a bigger single level area, larger columns for the skeleton and higher seismic coefficient of the underground foundation than the higher level part.

To creatively achieve the best overall social and economic resource benefits, the space of the lower level part shall be full utilized. This embodiment provides space the lower level part can form multiple levels of floor space to create more benefits. Where, the level adjacent to the higher level part is configured with the maintenance equipment facility, space and warehouses V, a remote plant operation monitoring system U and a rest room for management and duty persons W, and in an area of two-floor height is configured with power transmission, distribution and supply facilities N, and the other lower floors serve as a green industrial park featuring self sufficiency of clean electric energy and thermal energy configured with production & processing equipment O or other economic activity facilities or is planned as a green, energy-saving and environment-friendly residence featuring self-sufficiency of clean energy.

The higher level part H is the main body for installing the wind energy power generating system. To collect stronger air flows, a wind collection and directing wall D is configured in the lower part 1H of the higher level part. The height and area of the level of space b for installing the wind energy power engine depends on its specifications and the height ranges from about 3 m to 30 m. The height and area of the level of space for installing the generator G, air compressor C, air pressure reservoir cylinder tank I and pneumatic motor M also depends on the equipment specifications, and ranges from about 3 m to 7 m. In each level of space b, there is floor F in the rotating coverage of the wind energy power engine and in the narrow area around it, but there is no floor in the coverage of the wind collection and directing walls.

Except for the structural skeleton of column B1 and beam B2, there is no fixed walls or other air flow blocking objects around each level of space b in the higher level part H, but a mobile or movable electric or pneumatic divider plate or shutter door B7 which can open/close manually or automatically is configured around the level of space adjacent to the wind energy power engine or under the beam B2 if necessary. At locations that are substantially in the middle of the floor F of each level, there is an assembling window B4 for connecting the central rotor 1 of the adjacent two wind energy power engines, and there is furthermore an upper mounting rack B6 and a lower mounting rack B5 which are used for mounting the wind energy power engine and can be installed on the beam B2 or secondary beam.

The layout of each level of space is normally determined when the overall power generating system plant is planned. The layout shown is an application example a group is formed by 3 levels of space, which can be two levels or five levels of space or any combinations thereof. In this combination of three levels of space, the middle level is configured with a generator G, an air compressor C, an air pressure reservoir cylinder tank I, a pneumatic motor M or turbine J, power transmission groups 10, 11, 12 and a secondary power transmission group 10-1, and the upper level of space and lower level of space are respectively configured with a wind energy power engine (AP) which is vertically mounted on the lower mounting rack B5 and upper mounting rack B6) through a bearing 4 fitted onto the upper shaft part 1b and lower shaft part 1a of its central rotor 1; the wind energy power engine in the upper level of space is connected to the upper shaft part of the vertical drive shaft 9 via a clutch 5 or coupler 6 by means of the lower shaft part 1c of its central rotor; the wind energy power engine in the lower level of space is connected to the lower shaft part of the vertical drive shaft 9 via a clutch or coupler by means of its upper shaft part 1d, and the vertical drive shaft 9 is vertically mounted on the upper and lower mounting racks B5, B6 through the bearings fitted onto the upper and lower shaft parts, to form a unit of wind energy power engines with a higher rotational power output; and there may be many units of wind energy power engines depending on the system size.

The left part of the figure shows that a vertical elevator T with a large elevator car T1 is configured on the outer side of the support construction B; an anemometer or anemoscope K is configured at least in two directions on the outer side of at least one level in the higher level part H, and is also electrically connected to the automatic control system E; each generator or wind energy power engine or engines is configured with a revolution sensor and is electrically connected to the automatic control system; there is a roof at the top of the topmost level of the higher level part H2 of the support construction B, which is also configured with a lightning protection unit and a water supply tank.

Figure 5:
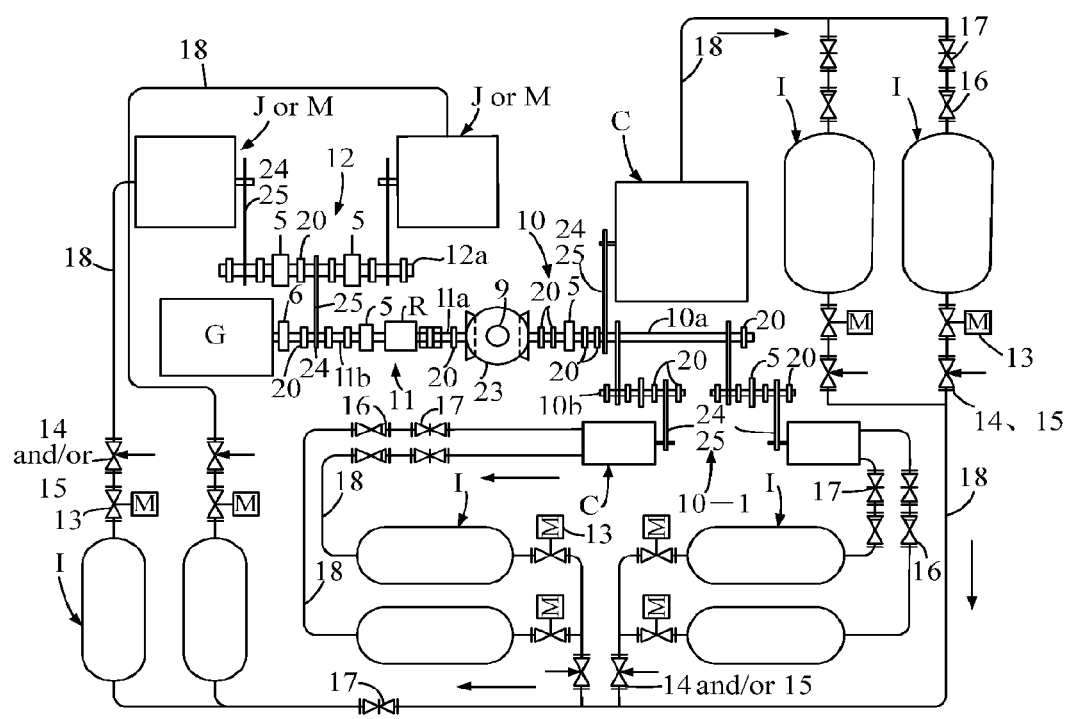
FIG. 5 is a plan view of the wind energy power generating system of the present invention which has a compressed air energy storage system and a power generator driven by the stored energy the power generator is driven by the wind energy power engine when there is normal wind force and the wind force can be regulated and balanced when its strength changes.

FIG. 1 only shows two units of wind energy power engines (2AP), and the vertical drive shaft transmits power to the power transmission group 11 and/or power transmission group 10 containing the clutch 5 via a gear or a bevel gear 23; FIG. 5 gives a detailed illustration of the equipment configuration, energy & power transmission flow and operation functions of the power generating system as well as the method of controlling the system's characteristic functions:

When the natural wind speed is within the rated normal range, the wind energy power engine (AP) or engines (2AP or 4AP) drive the generator G to operate and generate power, the power is transmitted to drive the generator through the power transmission group 11 by means of the bevel gear 23 or an appropriate gear of the connected vertical drive shaft 9; the power transmission group 11 includes two serially connected horizontal drive shafts 11a, horizontal common drive shaft 11b, clutch 5, gear shift mechanism R, coupler 6, and bearing & support 20; the horizontal drive shafts 11a and horizontal common drive shaft 11b are fixed onto the secondary beam or floor F by use of the bearing and support 20.

When the wind speed or the revolution speed of the wind energy power engine or engines exceeds the set normal revolution range, the automatic control system E will control and select to start one, two or more air compressors C according to the wind speed strength or the set parameter value of the revolution change magnitudes of the wind energy power engine or engines so as to adjust the wind energy power engine or engines to maintain their normal stable operation state; once an air compressor receives the command of starting operation, the clutch of the corresponding power transmission group 10 or secondary power transmission group 10-1 will automatically engage to connect with the vertical drive shaft 9 to transmit power, and the corresponding air compressor will start operation and the high-pressure air will be accumulated in the air pressure reservoir cylinder tank I via the piping 18 connected with a gate valve 17 and a check valve 16.

The power transmission group 10 includes the primary power transmission group 10 and the secondary power transmission group 10-1. The primary power transmission group is composed of two horizontal drive shafts 10a, a clutch 5, a chain 24 or belt, and a sprocket gear 25 or belt gear, and the horizontal drive shaft 10a is fixed at an appropriate location onto the secondary beam or floor F with the bearing and support 20; one end of the horizontal drive shaft 10a is configured with a bevel gear 23 or an appropriate gear for engagement with the bevel gear or appropriate gear of the vertical drive shaft 9, a set of sprocket gear and chain or bevel gear or belt is connected to the main air compressor C, and this main air compressor accumulates high-pressure compressed air into one or more air pressure reservoir cylinder tanks I through the piping connected with a gate valve 17 and a check valve 16; the primary horizontal drive shaft 10a is also connected in parallel to at least one or more secondary power transmission groups 10-1 and the corresponding air compressors by means of chain or belt, and the secondary power transmission group includes the horizontal drive shaft 10b of a combination of at least two shafts, the clutch 5 mounted on it, sprocket gear 25 or bevel gear and bearing & support 20; the horizontal drive shaft 10b is fixed onto the secondary beam or floor with the bearing and support 20, the sprocket gear is connected to the sprocket gear in the shaft part of the corresponding air compressor C via a chain; each air compressor accumulate the air into at least one or more air pressure reservoir cylinder tanks I through the piping 18 connected with a check valve 16, a gate valve or a valve. The embodiment shows that each air compressor is connected to at least two air pressure reservoir cylinder tanks.

When the wind speed decreases to lower than the set value range or the revolution speed of the wind energy power engine or (2AP or 4AP) or generator is lower than the set rated value range, by means of the sensing and transmission of the sensor, the automatic control system sends a control command. The clutch 5 of the power transmission group 11 of the wind energy power engine or engines for connecting the generator will automatically disengage after receiving the control command, and meanwhile among the air pressure reservoir cylinder tanks full of high-pressure air indicated by the pressure sensor, the magnetic control valve 13 of the air pressure reservoir cylinder tank which receives the command to output will open and the high-pressure air will flow out of the air pressure reservoir cylinder tank and pass through the throttle valve 14 and/or pressure regulating valve 15 for flow and pressure adjustment, and the pneumatic motor M or turbine J will output controllable power, and in the meantime, the clutch 5 which connects the power transmission group 12 to the pneumatic motor M or turbine and the generator G and receives the command to engage will automatically engage, and the power is transmitted to the common horizontal drive shaft 11b to drive the generator to operate and generate power. The arrow direction shown in FIG. 5 indicates the flow direction of the high-pressure air in the piping.

All air pressure reservoir cylinder tanks I are connected to at least one pneumatic motor M or turbine J by means of the piping 18 connected with a magnetic control valve 13, a throttle valve 14 and/or a pressure regulating valve 15; each air pressure reservoir cylinder tank or its connected piping is configured with a pressure sensor, and is also electrically connected to the automatic control system.

In occasions where two pneumatic motors or turbines are installed, the power transmission group 12 includes a horizontal drive shaft 12a comprising at least three shafts, two clutches 5, six sets of bearings and supports 20, and a sprocket gear 25 or a bevel gear, and the horizontal drive shaft 12a is fixed onto the secondary beam or floor with the bearings and supports.

The parts shown and described in FIG. 1 and FIG. 5 are combined into one unit of wind energy power generating system, there may be many units of wind energy power generating systems installed in the said support construction B to output and supply power in combination with power transmission, distribution and supply facilities N.

Figure 2:
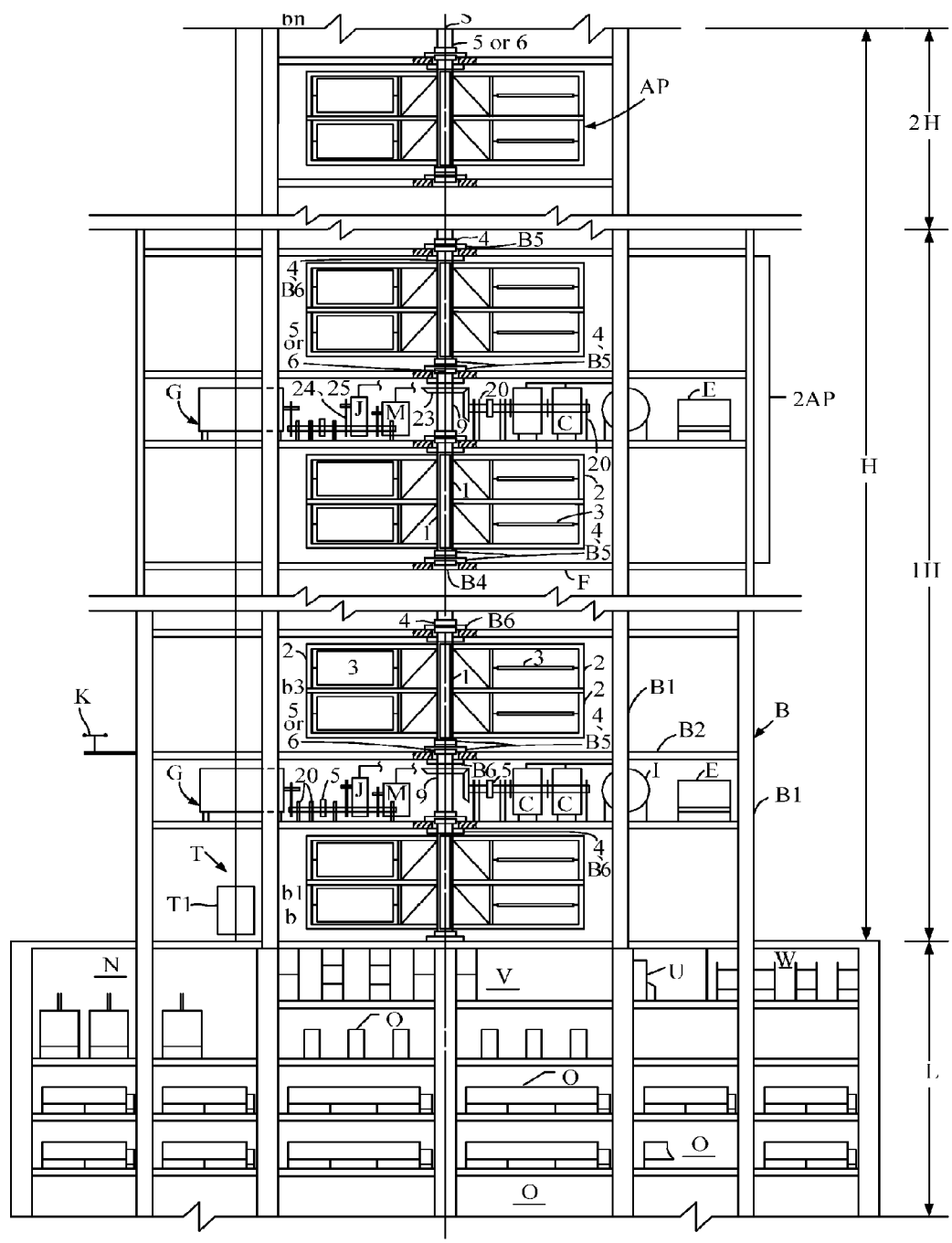
FIG. 2 is a main view of the wind energy power generating system the power generator is driven by the stored energy power from a stored energy power system that can regulate and balance the wind force actions of the wind energy power engine.
Figure 6:
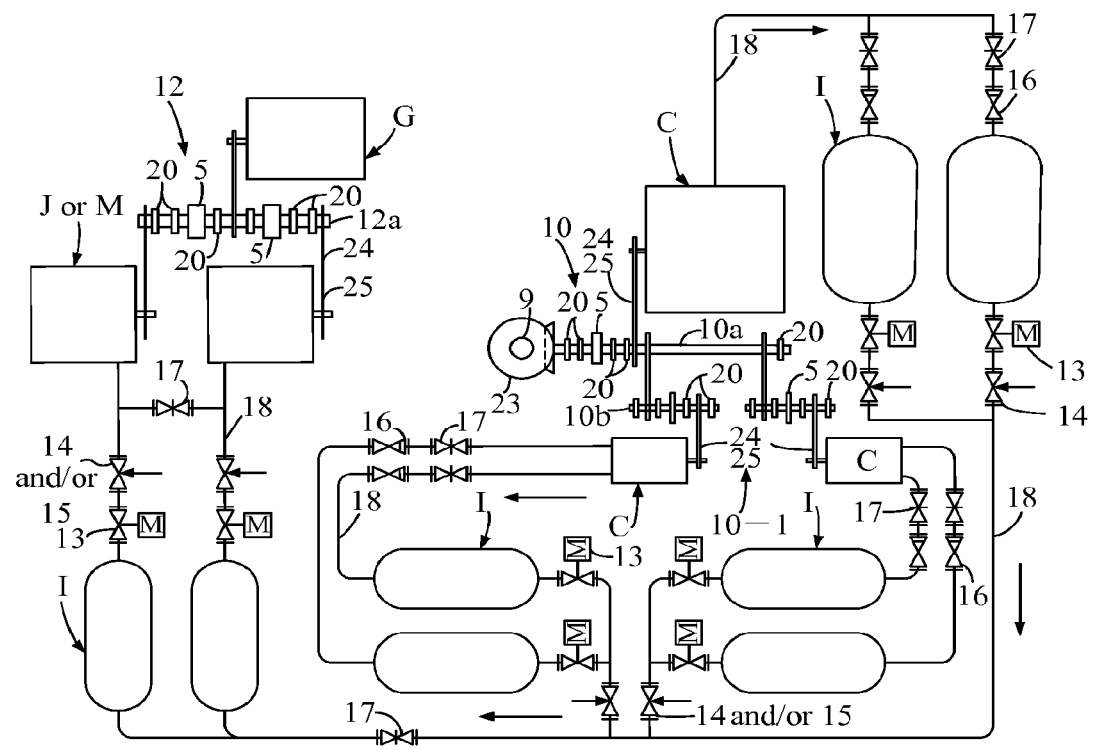
FIG. 6 is a plan view of the wind energy power generating system of the present invention which has a generator driven by the power from the stored energy power system which can adjusts and balances the wind force.

FIG. 2 and FIG. 6 show the wind energy power generating system described in claim 9, which is different in composition from that described in claim 10 in that it completely uses the stored energy power system and method to drive the generator to operate. The overall design of the support construction B, the installation, composition and stored energy power system, method and equipment configuration of the wind energy power engine (AP) and combinations thereof shown in the figures are all the same as those shown in FIG. 1 and FIG. 5; therefore no further description will be given here for the same parts.

The plan view shown in FIG. 6 is given here to describe the features of the system:

The wind energy power generating system is designed to provide a method and a technical means of using a stored energy power system to output adjustable, stable power to drive the generator to operate and generate power and output stable and high-quality electric power, and furthermore, this purpose can be achieved even at different wind speeds or in case of no wind for a longer period of time.

The number and specifications of the wind energy power engines, air compressors, air pressure reservoir cylinder tanks to be configured depend upon the local wind speed conditions and power generation capacity, and furthermore, the building height of the support construction shall also be considered.

At normal wind speeds, the power generating system uses the main air compressor C or a certain number of air compressors C to operate and output adjustable high-pressure air to drive the pneumatic motor M or turbine J and drive the generator G for power generation by means of the air pressure reservoir cylinder tank I, piping 18 and control valves 13, 14, 15, 16, 17. The arrow direction shown indicates the output flow direction of the high-pressure air.

When the wind speed increases to exceed the normal value range or the revolution speed of the wind energy power engine (AP) or combination thereof (2AP or 4AP) exceeds the set value range, after receiving a signal from the anemometer or anemoscope K or the revolution sensor, the automatic control system E will select and adjust the number of the operating air compressors C according to the parameter values, and the clutch 5 of the corresponding secondary power transmission group 10-1 of the air compressor receiving the operation command will automatically engage, the air compressor starts operation, and the high-pressure air accumulates in the air pressure reservoir cylinder tank, so that the wind energy power engine or engines can still maintain stable and desirable operation state; the redundant high-pressure air accumulated in the air pressure reservoir cylinder tank will serve as power energy to drive the generator for power generation in case of no wind.

When the natural air flow or the revolution speed of the wind energy power engine or combination thereof is lower than the set normal value range, the automatic control system E will select to reduce the number of the operating air compressors according to the wind speed or the set revolution speed value, and the wind energy power engine can still maintain normal and stable operation; however, when the wind speed is so weak that the air compressor C or the wind energy power engine cannot operate efficiently, the clutch 5 of the wind energy power engine or combination thereof for connecting the vertical drive shaft 9 or the clutch 5 for connecting the power transmission group 10 will automatically disengage to separate the load of the wind energy power engine, so that the wind energy power engine will start from no load or small load the next time it restarts. Therefore, the wind energy power engine can quickly start operation at a lower wind speed, which increases its power efficiency. In the meantime, even if the wind energy power engine and air compressor stops operation due to lack of wind, the generator can still be driven by the pneumatic motor or turbine whose power is supplied by the air pressure reservoir cylinder tank I full of sufficient high-pressure air so that it can continuously and stably operate and generate power.

FIGS. 5 and 6 also show two-stage air pressure reservoir cylinder tanks I of two-stage pressure air supply, the one connected after the air compressor is the first-stage air pressure reservoir cylinder tank of ultra high pressure air supply which is connected to the second-stage air pressure reservoir cylinder tank I of high- to medium-pressure air supply by means of piping 15 connected with a check valve 17 and outputs high- to medium-pressure air through the throttle valve 14 or the pressure regulating valve 15.

Figure 3:
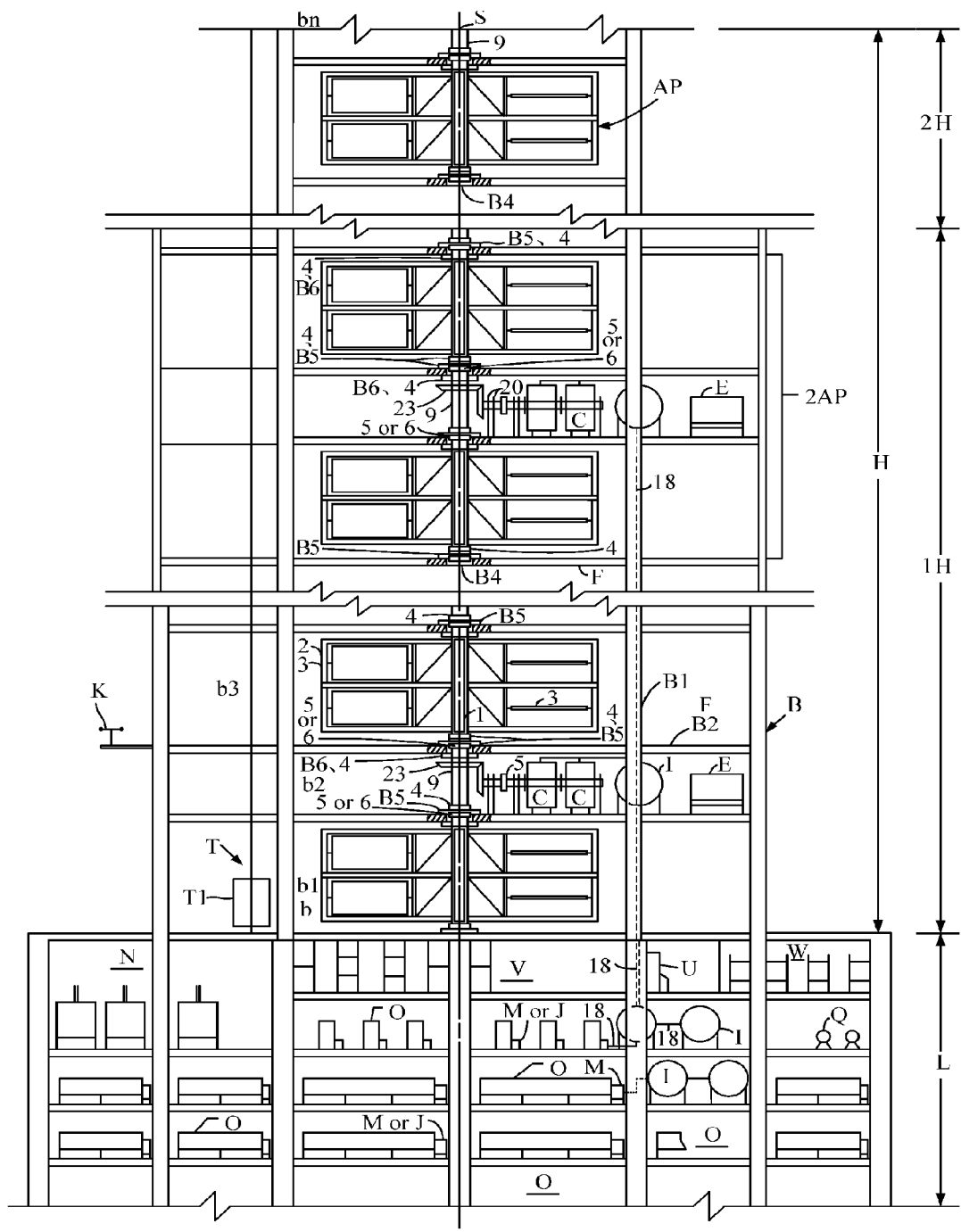
FIG. 3 is a main view of the wind energy power generating system of the present invention which has a stored energy power system that can regulate and balance the wind force actions of the wind energy power engine and which provides the stored energy to drive the industrial production and processing equipment.

FIG. 3 shows a wind power system described in claim 7, which directly supplies power to industrial production & processing equipment through the stored energy power system, instead of the traditional electromotor which consumes electric energy.

The total height and total area of the support construction B is planned and built according to the functions and size of the power system, and is divided into two parts, i.e., the lower level part L and the higher level part H, and its composition is same as that of a wind energy power generating system. The figure shows that three levels of space b form one group, and the middle level is configured with an air compressor C, an air pressure reservoir cylinder tank I, a power transmission group 10, a secondary power transmission group 10-1 and an automatic control system E, while the pneumatic motors M or turbines J are respectively configured at the places on each floor in the lower level part where the industrial production & processing equipment is installed and are directly connected to the processing equipment or connected via the gear shift structure, and provide controllable and stable power for revolution. The air pressure reservoir cylinder tank configured in the middle level of space (n) is connected to the air pressure reservoir cylinder tanks I configured in the lower floors through piping 18 connected with a magnetic control valve 13, a throttle valve 14 and/or a pressure regulating valve 15 to supply high-pressure air, and these air pressure reservoir cylinder tanks in the lower floors then distribute the high-pressure air to the pneumatic motors M or turbines J through the piping 18 connected with the magnetic control valve, throttle valve and/or pressure regulating valve.

Different kinds of industrial production & processing equipment have different revolution speed needs during processing, so the pneumatic motors or turbines can output at different revolution speeds by the operation of the throttle valve, pressure regulating valve or gear shift mechanism.

Figure 4:
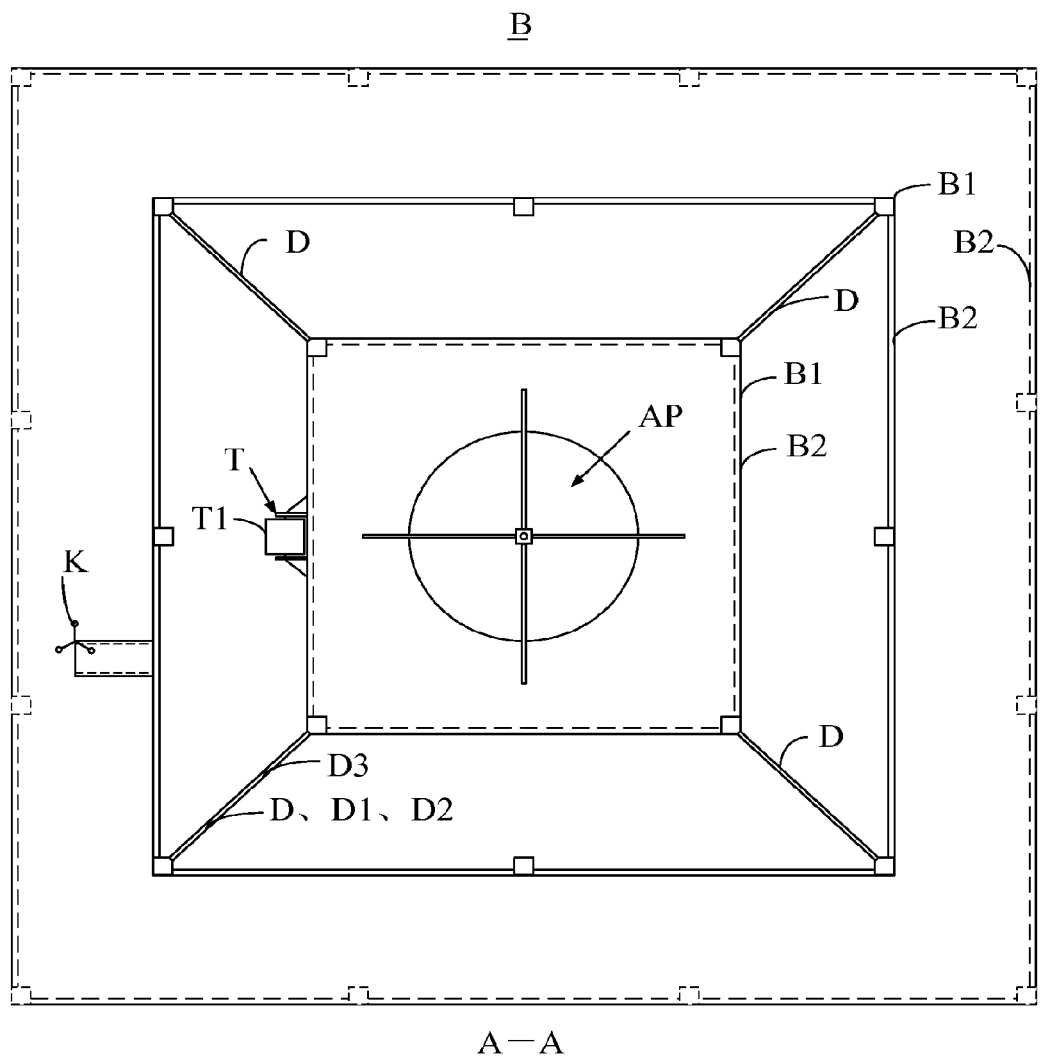
FIG. 4 is a top view of a cross section of the main view of the wind energy power generating system or wind power system of the present invention.

FIG. 4 is the transverse sectional view of the support construction B of the wind energy power generating system and wind power system. The figure shows that the wind energy power engine (AP) is installed in the middle of the level of space b in the higher level part H. Within the coverage of the wind energy power engine, all levels of space b1~bn called "the first area" around the first circle of beams B2 are configured with floor F, an wind collection and drainage wall D is built from the outer side of the columns B1 at four corners to the diagonals of the columns B1 at four corners of the so-called "second area" around the second circle of beam B2, which can be built from different directions, depending upon the main air flow direction. The wall can be made from light bricks or boards D1, and refer to 1H in the figure for the building height. A solar energy optoelectric or light-heat conversion unit D2 is mounted on the façade of the wall, and the electric energy it generates is accessed to the power supply network of the wind energy power generating system. Hot water, if any, will be supplied to those who conduct economic activities in the lower level part L. A drainage window D3 for windstorm drainage is configured on the wind collection and drainage wall D adjacent to the column B1, which can eliminate the wind collection function by opening the door during a windstorm, and meanwhile, manual operation or the automatic control system can be used to control the opening degree of the electric or pneumatic shutter door B7 or divider plate to adjust the maximum wind-bearing capacity of the wind energy power engine. The area (i.e., the second area) of the wind collection and drainage wall D does not have any floor, so that the solar energy optoelectric or light-heat conversion unit can maximum the sunlight collected.

The support construction B is configured with a vertical elevator T with a large elevator car as well as guide rails mounted on supports in the same vertical line of the beam B2 in all levels of space b1~bn, which reaches the lower level part and extends into the ground floor to facilitate the transportation of workers and goods.

On the outer side of the structural body in the second area of the higher level part H, an anemometer or anemoscope K is configured in at least two directions in the appropriate level of space, and is also electrically connected to the automatic control system E. The electric or pneumatic shutter door is installed under the beam B2 in the first area and is also electrically connected to the automatic control system E.

Figure 7:
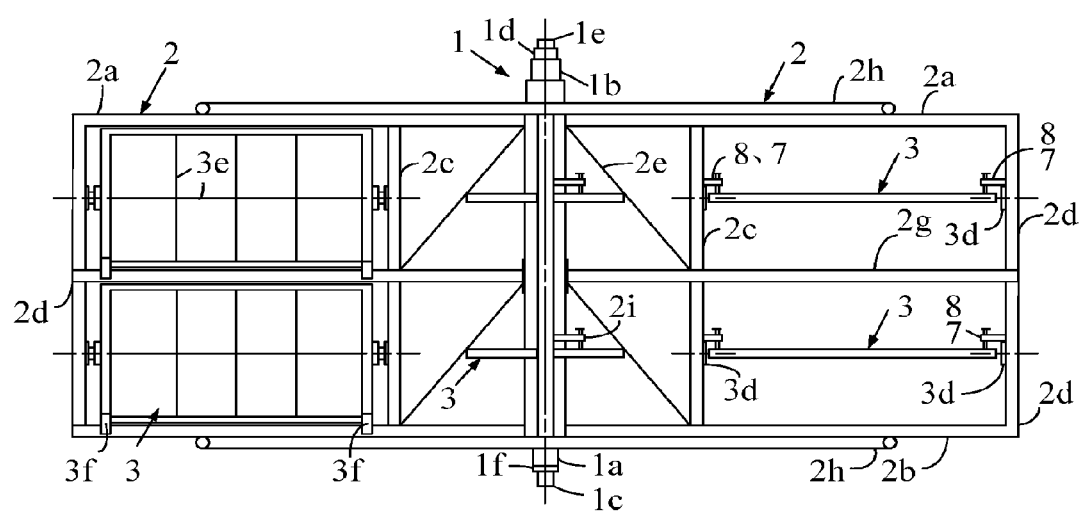
FIG. 7 is a front view of the wind energy power engine of the present invention which has two units of frameworks and eight sets of power generation parts.
Figure 8:
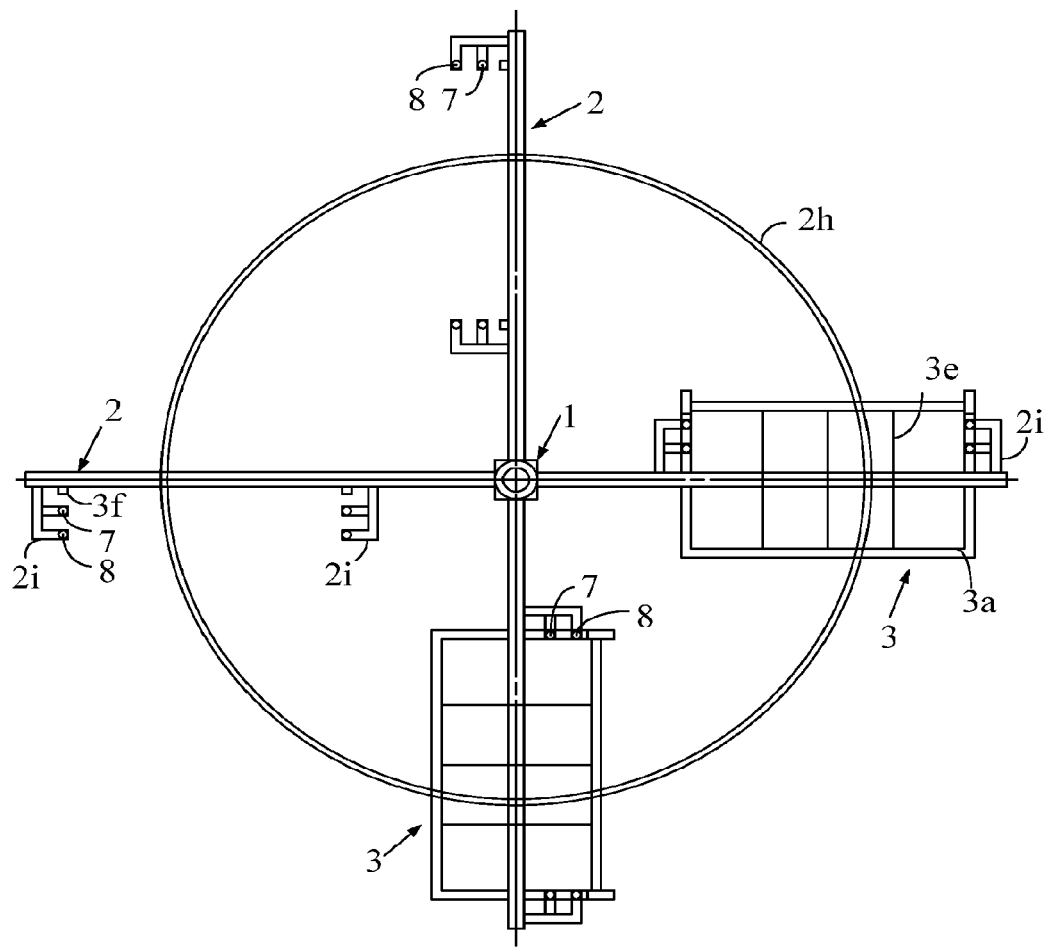
FIG. 8 is a top view of the wind energy power engine shown in FIG. 7.

FIG. 7 shows the main composition of the wind energy power engine (AP) mentioned in claim 1, and FIG. 8 is the top view of FIG. 7. Based on different power needs, wind energy power engines are available with different sizes and specifications. The power of a single larger wind energy power engine in this embodiment can be as high as thousands of kilowatts.

The composition of the wind energy power engine includes: a center revolving body 1, around which several groups of frameworks 2 are uniformed distributed, and each framework is installed with at least one set of power generation parts 3. The embodiment in the figure shows two units composed of eight groups of frameworks 2, and each group of frameworks is installed with one set of power generation parts 3.

The center revolving body is made of steel pipe or square steel pipe, with both ends embedded into the said shaft parts, welded and formed to different sections of shaft parts 1a, 1b, 1c, 1d, 1e and 1f after finish machining of concentricity. Shaft parts 1a, 1b are assembled with bearing 4 to vertically mount the center revolving body on the lower mounting rack 5 and upper mounting rack 6; shaft parts 1f or 1e are assembled with a distributor 21; and the shaft part 1c is used for joining to the upper shaft part 1d of the wind energy power engine integrated below via a clutch or coupler.

The eight groups of frameworks are formed by combining the upper four groups and the lower four groups into two units. The framework can be one unit or a combination of two or more units. The bottom faces of the upper and lower units of frameworks are respectively configured a reinforcing ring 2h to fix the frameworks firmly. The power generation parts is installed in a position about the height of the columns 2c, 2d of the framework or higher than this height by ½ with a bearing 3d by means of the support shaft 3c. The left part of the figure shows that the power generation parts is lifted by air flows upon opposing wind so as to be almost horizontal to the air flows or is in a bit slant status without any air flow resistance, the lift degree is controlled by the opening adjustment positioner 7, and with such a pose, the power generation parts can quickly return and close when it rotates to a fair wind zone. The left part of the figure shows that the power generation parts return and close in the fair wind zone and are perpendicular to air flows, and the positioning block 3f defines the position to bear the wind pressure by firmly pressing against the common beam 2g and the lower beam 2b.

The integrated assembly bracket 2i of the framework is configured with a power generation parts brake 8 and is also electrically connected to the distributor 21. The operating method for stopping the wind energy power engine under operation is as follows: Turn on the power switch 22 of the distributor, the brake 8 switches on to make magnetic excitation to generate magnetic force to attract the power generation parts 3. All power generation parts will be lifted upon opposing wind and blocked by the opening adjustment positioner 7, and meanwhile is attracted by the brake 8, and furthermore, it can not return to the original positions even in the fair wind area, so the air flows cannot push the power generation parts, and the wind energy power engine stops operation. Turn off the power switch 22, the brake is demagnetized, in any fair wind area any power generation parts will automatically return to its original position since the lower half part below the central line of the support shaft 3C of the power generation parts is a bit heavier than its upper half part, and the wind energy power engine can continue its rotation and output power. The wind energy power engine can also be controlled to operate or stop by means of the opening/closing of the divider plates or shutter doors in each level of space.

Figure 9:
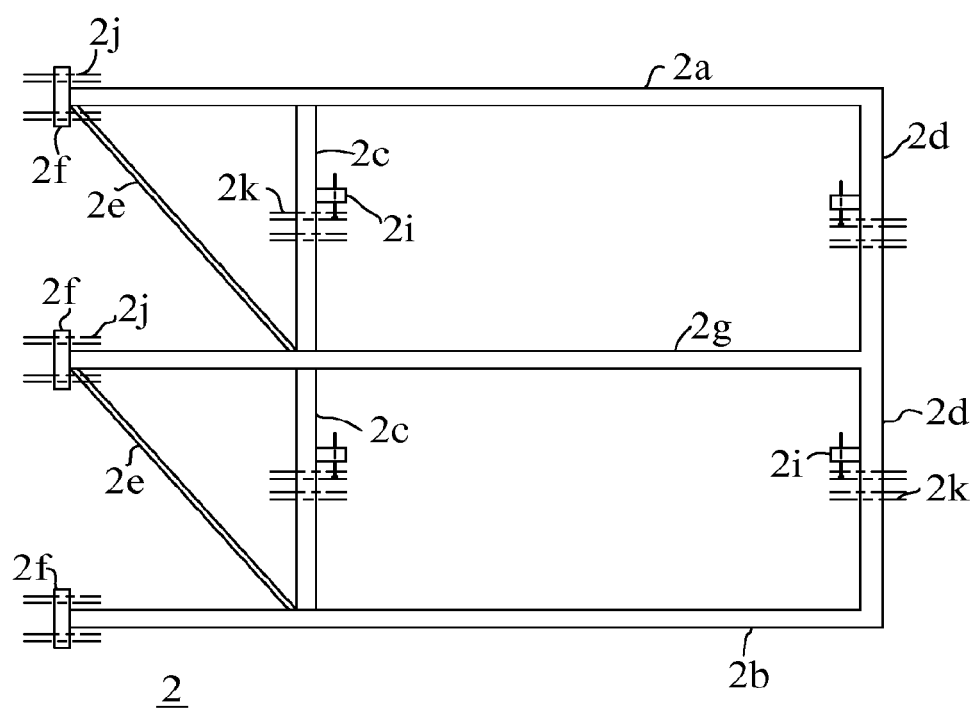
FIG. 9 is a front view of the framework 2 of the wind energy power engine of the invention.
Figure 10:
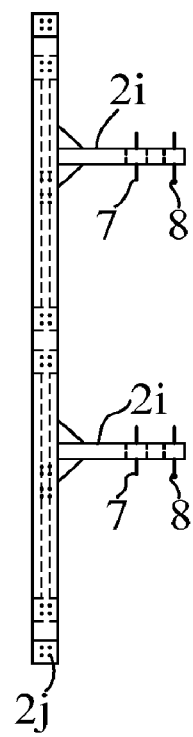
FIG. 10 is a side view of the framework 2 of the wind energy power engine of the invention.

Further description will be given to the construction of the framework 2 in the following. FIG. 9 is the principal view, and FIG. 10 is the side view. The figures show a framework 2 comprising two units, which is composed of an upper beam 2a, a lower beam 2b, columns 2c and 2d, a diagonal bracing rod 2e and a fixed mounting plate 2f by means of overall welding. It can also be combined and mounted on the center revolving body 1 with bolts and then reinforced by welding. The framework includes two units which form two levels of eight groups in four pairs that are 90 degrees from each other and are mounted on the corresponding set positions of the center revolving body 1 by use of the fixed mounting plate via through-holes with bolts. There are through-holes 2k for mounting bearings in the middle of the columns 2c, 2d of each group of frameworks, where the bearing 3d of the support shaft 3c of the power generation parts is installed. Thus, the framework can be controlled to be lifted and rotate in the set revolution range in a controllable mode.

In addition, there is a integrated assembly bracket 2i in the position about ½ height of the columns 2c, 2d on one side, with a certain length, which is used to make the brake 8 mounted on it be close to the lower end of the shape frame 3a or above the positioning block part when the power generation parts rotates and is lifted to almost horizontal position, so as to improve the suction. The integrated assembly bracket is also configured with an opening adjustment positioner 7 whose position can be adjusted properly to control the turnover opening degree of power generation parts so that it can quickly locate and return to its original position in a fair wind area.

Figure 11:
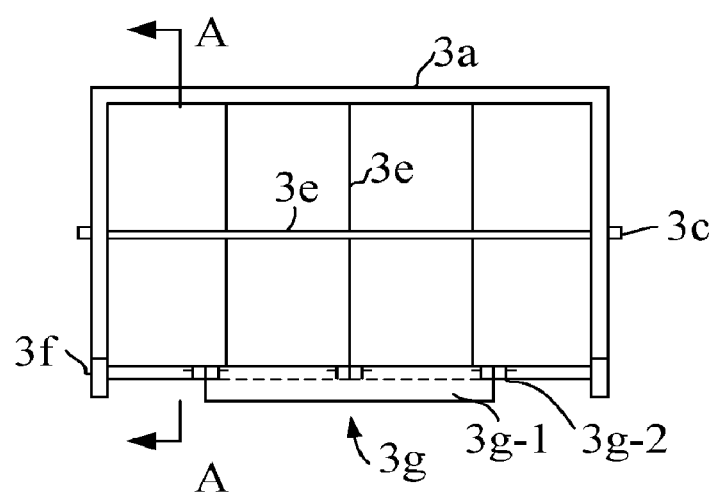
FIG. 11 is a front view of the power generation parts 3 of the wind energy power engine of the present invention.
Figure 12:
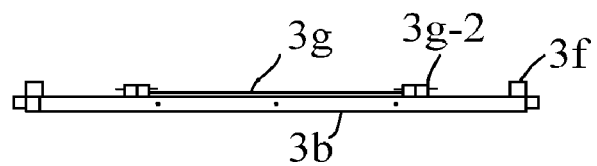
FIG. 12 is a bottom view of the power generation parts shown in FIG. 11.
Figure 13:
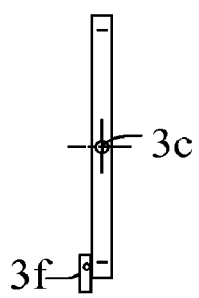
FIG. 13 is a side view of the power generation parts shown in FIG. 11.
Figure 14:
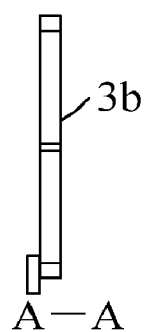
FIG. 14 is a sectional view of the power generation parts shown in FIG. 11.

FIG. 11 gives further description of the composition of the power generation parts 3). FIG. 12 is the bottom view of FIG. 11, FIG. 13 is the side view of FIG. 11, and FIG. 14 is the sectional view of FIG. 11. The power generation part 3 is welded with steel pipe or appropriate profile to form a shape frame 3a. One side of the shape frame is welded airtightly with steel sheet 3b or molded with glass fiber reinforcing resin to form a wind-collection concave shape frame. Its internal free area is separated into several well zones with plates 3e, there is a support shaft 3c in the same horizontal central axial line in about the middle of the height of the two vertical side frames of the shape frame 3a or on the outer side in a position about higher than its ½ height, there is a positioning block 3f on the front face in the lower end of the two side frames, and the positioning block can make the power generation parts completely extend into the framework upon return in fair wind so that it is perpendicular to the air flow direction and bears complete thrust pressure.

A group of turnover and return mean 3g is configured in the front of the bottom frame of the shape frame 3a. It has a wind-bearing wind pressure plate 3g-1 which has a certain area, can collect wind and bear wind pressure. Through its three parts on the top side, it is perpendicularly fixed onto the bottom frame by use of a hinge or pivot and pivot seat or bearing 3g-2. In case of fair wind, its upper part presses on the bottom frame side and can bear wind force; while in case of opposing wind, it can assist the power generation parts to turn over at a "soft" speed within normal wind speed range. However, if the wind speed is too high so as to exceed the normal value range, the turnover and return mean will be lifted toward the back direction by the strong wind, reducing the boost function, so that the turnover speed of the power generation parts can be controlled to avoid impact force.

FIG. 15 shows the structure of the integrated assembly bracket 2i. It is made of square pipes. Its front support is mounted with a brake 8, and another support is mounted with an opening adjustment positioner 7. The brake 8 has a long screw 8a which is inserted into the through-hole of the integrated assembly bracket in a sliding fit and fixed with two upper and lower nuts 8b to adjust the higher or lower position. Under the screw is an enclosure 8c whose internal space is configured with a core and field coil group 8e which is used to generate magnetic force. The conducting wire 8f of the field coil is electrically connected to the conducting wire 21e of the distributor 21. An iron piece 8d is used to fix the core and field coil group inside the enclosure 8c. The higher/lower position of the brake 8 depends upon the setting of the opening adjustment positioner 7. To avoid any collision, there is a safe tolerance gap between its enclosure and the lifted power generation parts.

The opening adjustment positioner 7 has a long screw 7a which supports rotation and up/down shift adjustment and is threaded to a nut socket 7b fixed onto the integrated assembly bracket and can be fixed with a nut 7c after locating, and its front shaft part 7e can be configured with an elastor or buffer 7d, which is threaded and fixed with a latch 7f. The buffer can eliminate the impact force arising from quick turnover of the lower part of the power generation parts.

Figure 17:
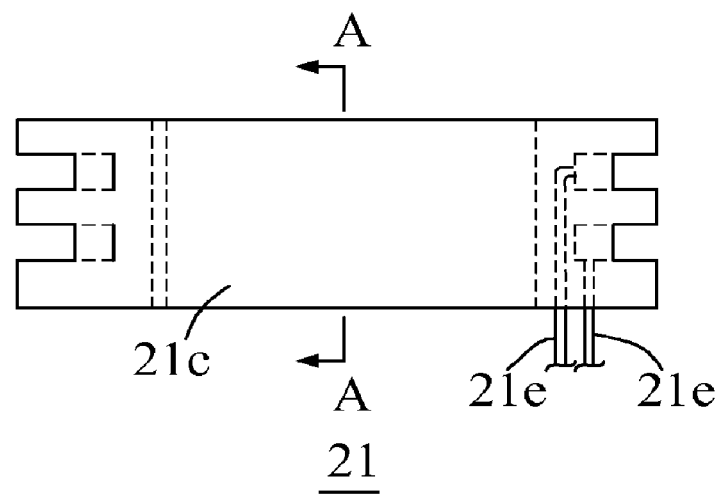
FIG. 17 is a front view of the distributor 21 mounted on the shaft part of the central rotor of the wind energy power engine of the present invention.
Figure 18:
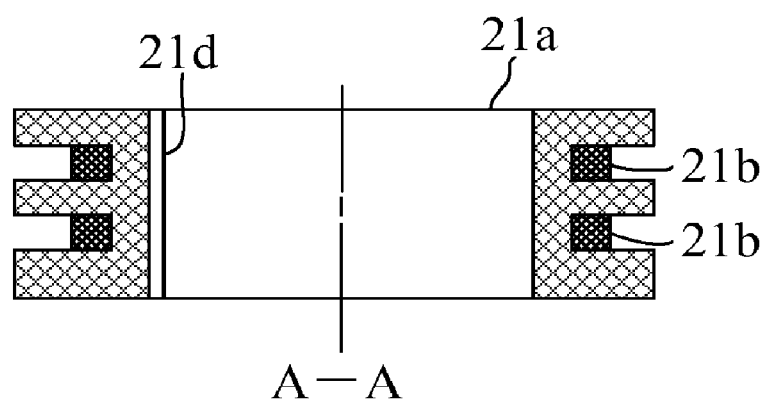
FIG. 18 is a sectional view of the distributor shown in FIG. 17.
Figure 19:
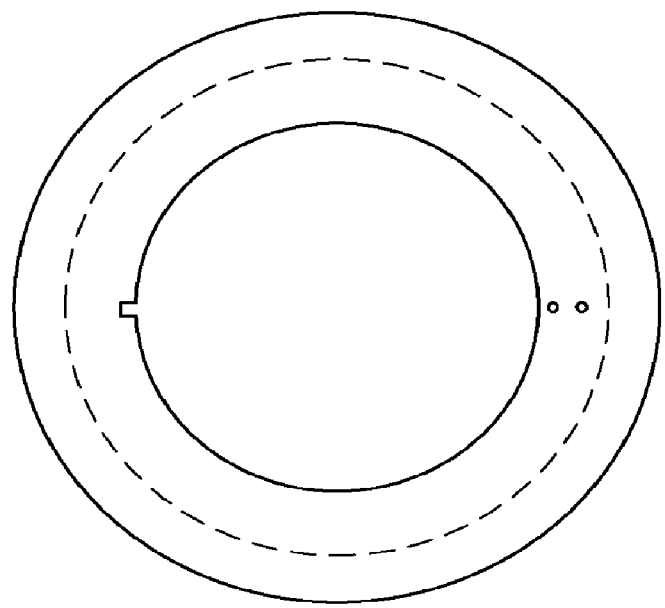
FIG. 19 is a top view of the distributor shown in FIG. 17.

FIG. 17 is the front view of the distributor 21, FIG. 18 is the sectional view of FIG. 17, and FIG. 19 is the top view of FIG. 17. The distributor 21 has an insulator ring 21a along the outer annulus of which there are two round grooves properly isolated uniformly from each other, copper conducting rails 21b are configured inside the two grooves, and the central through-holes 21c are used for the shaft part 1e or 1f of the center revolving body 1, fixed with key groove 21d, keys and screws. The conducting rails have conducting wires 21e for electrical connection to the conducting wires 8f of the field coil.

Figure 20:
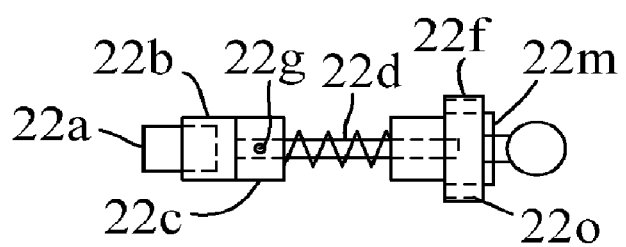
FIG. 20 is a top view of the power switch 22 of the distributor.
Figure 21:
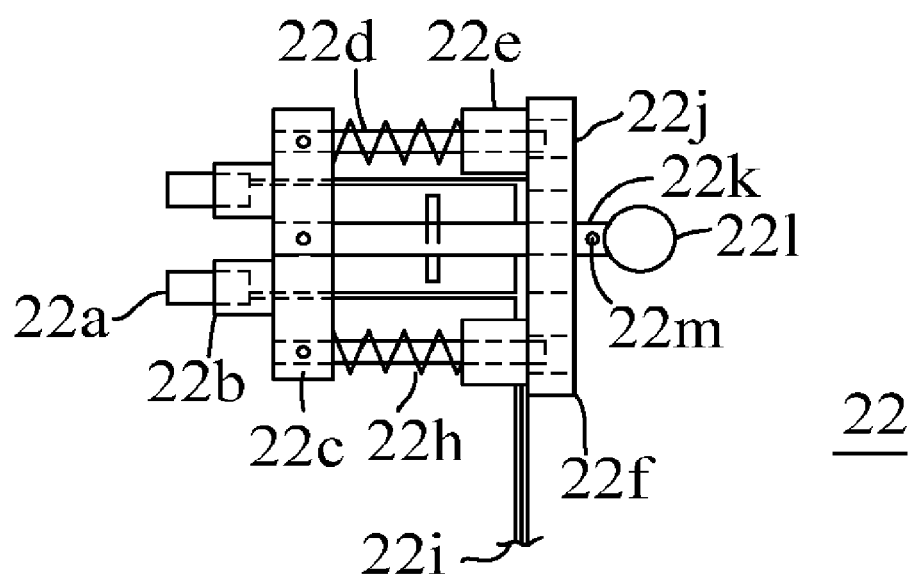
FIG. 21 is a front view of the power switch 22 of the distributor.

FIG. 20 and FIG. 21 shows the composition of the power switch. Two mutually separated conducting carbon brushes 22a which can match and contact the two conducting rails 21b are respectively fixed inside the insulation kit 22b. The conducting carbon brushes are connected to the conducting wires 22i for power supply, the insulation kit is fixed on the bracket 22. The bracket is loaded with a compression spring 22h via two support rods 22d, which can be inserted into the slide bearing 22e and through-hole 22j of the support 22f in sliding manner, and the bracket is inserted into one end of the support rod in a tight fit and fixed with a latch 22g. An operating lever 22k is installed in the middle of the bracket, one end of the operating lever passes the through-hole of the support 22f, with a ball-shaped handle 22l on the front end, and furthermore, the upper locating point and the lower locating point with a certain distance from each other on the operating lever respectively have a locating pin 22m, 22n 90 degrees from each other. The support 22f is fixed on a fixed object in the adjacent position so that the operation command from the power switch can make the conducting carbon brushes accurately insert into the grooves of the distributor 21 to contact with the conducting rails 21b. The spring 22h makes the conducting carbon brushes (22a) contact the conducting rails with flexible pressure. The power switch is a normally open relay. Only when the wind energy power engine (AP) is required to stop operation will the power switch be operated in manual mode. If the power switch is to be operated in automatic control mode, the ball-shaped handle shall be replaced with a magnetic valve or a cylinder with an air pressure piping and shall be electrically connected to the automatic control system E.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

The invention claimed is:

1. A wind engine, comprising
a vertically positioned central rotor (1);
a power generation part (3);
an opening adjustment positioner (7);
a brake (8);
a power distributor (21); and
a power switch (22);
wherein
said vertically positioned central rotor (1) has one unit of several groups of frameworks (2) evenly distributed around it, or has at least two units of several groups of frameworks (2) distributed longitudinally and consecutively along its length;
each group of said frameworks (2) is provided with at least one set of said power generation parts (3) which can turn within a set range;
a profile frame (3a) of said power generation parts (3) has support shafts (3c) of the same horizontal central line each positioned at ½ or ⅖ to ⅗ of the longitudinal height of the left and right side frames, and are installed with a bearing (3d) onto the left and right columns (2c, 2d) of the corresponding frameworks (2), to form a structure which is centered around the support shaft and can adapt to the wind direction changes, so that during the reversing wind stroke it will automatically reverse to be in a state where its entire plane is almost horizontal to the air flow direction without any air flow resistance, and during the fair wind stroke it will automatically return to a closed vertical state where it bears the pushing force perpendicular to the air flow, thereby driving the rotation of the entire system to form a wind engine;
a bottom frame of said profile frame (3a) has a set of reversing and return boosters (3g) installed on one side that assists the power generation parts to reverse and lift and controls the reversing speed in case of a high wind speed;
at columns (2c, 2d) side of all groups of frameworks (2), there is said brake (8) for the power generation parts (3) for controlling the operation or stop of the wind engine and said opening adjustment positioner (7) for limiting the lifting angle of the power generation parts mounted on an integrated assembly bracket (2i); and
said brake (8) is electrically connected to said power distributor (21) installed on the lower shaft part (1f) or upper shaft part (1e) of the central rotor (1) via conductor or cable, and can control the make/break of the circuit via said power switch (22) of the power distributor (21), so that said brake (8) can release or limit the reversing of the power generation parts.

2. The wind engine of claim 1, wherein
said central rotor (1) has, on its upper end, a shaft part (1b) for accepting a bearing and a shaft part (1d) for accepting a clutch (5) or coupler (6) or a shaft part (1e) for accepting a power distributor, and has, on its lower end, a shaft part (1a) for accepting a bearing (4) and a shaft part (1c) for accepting a clutch (5), coupler (6) or gear or a shaft part (1e) for accepting a power distributor;
said central rotor (1) has a main body that is made of steel pipe or other appropriate material and has, at several locations as appropriate around it along its longitudinal direction, screw holes or through-holes for mounting the frameworks (2), wherein the shaft parts (1a, 1b) at both ends are respectively inserted and welded into both ends of the steel pipe of the main body and are processed by concentric fine machining; and
said wind engine can be vertically installed with the bearings (4) mounted on the upper and lower end shaft parts (1b, 1a) of the central rotor (1) onto the lower mounting rack (B5) and the upper mounting rack (B6) of the support construction (B).

3. The wind engine of claim 1, wherein
each group of said frameworks (2) comprises the columns (2c, 2d), upper beam (2a), lower beam (2b), diagonal bracing rod (2e), fixed mounting plate (2f) and integrated assembly bracket (2i) that are assembled altogether by welding, or are sub-assembled by means of fasteners and are assembled altogether by welding; in the design of two or more than two units of several groups of frameworks (2), the middle beams or each beam between the upper and lower beam are common beams (2g); the columns, beams and common beams are made of steel pipes or other appropriate material; and there is one reinforcing ring (2h) for fixing frameworks for each of the upper beam and the lower beam in the proximity of the periphery of the bottom surface;
said integrated assembly bracket (2i) is formed by square steel pipes of a certain length which are individually welded to a set location on one side of the columns (2c, 2d) and has a brake (8) for a group of power generation parts and an opening adjustment positioner (7) that are respectively mounted on two locations close to its end, wherein the two locations are close to a positioning block (3f) and respectively correspond to the lower positions of the two sides of the profile frame (3a); and
said frameworks are vertically fitted onto the corresponding central rotor (1) via the through-holes (2j) in the fixed mounting plate (2f) by bolts or are appropriately welded after such fitting.

4. The wind engine of claim 1, wherein
said power generation parts (3) has a profile frame (3a) fabricated with steel pipe or other appropriate material by welding, wherein one side serves as a closed wind force-bearing plane that is made of steel sheet (3b) airtightly welded around the profile frame, or is formed with glass fiber reinforced resin, wherein the internal area on the front face of the profile frame forms a wind-gathering concave shape which has along its longitudinal and transverse directions several areas separated by a plurality of divider plates (3e), and there is a positioning block (3f) on the lower end of each of the two bottom frames of the profile frame, and one support shaft (3c) of the same horizontal central line each is installed at ½ or ⅖ to ⅗ of the longitudinal height of the left and right side frames of the profile frame and is provided with a bearing (3d) to mount the power generation parts (3) onto the frameworks (2) via bolt through-holes (2k) by bolts; and on one side of the bottom frame of profile frame (3a), seen from the fair wind direction, there is a group of reversing and return booster (3g) on the front of the bottom frame, which comprises a wind force-bearing wind pressure plate (3g-1) with its top side perpendicularly fixed onto the bottom frame of the profile frame (3a) by use of a hinge or pivot, wherein the pivot seat or bearing (3g-2) can be rotated in a single direction.

5. The wind engine of claim 1, wherein the composition of the said power distributor (21) and its power switch (22) is: the power distributor (21) has an insulator ring (21a) along the outer annulus of which there are two grooves properly isolated from each other, and the two grooves each has a conducting rail (21b) in it, wherein the conducting rails are electrically connected to the conducting wires (21e), and are also electrically connected to the conducting wires (8f) of the field coil of the power generation parts brake (8); the insulator ring (21a) is slipped onto the shaft part (1e or 1f) by its central hole (21c) and fixed to the shaft part with the key groove (21d), keys and screws;

said power switch (22) has two mutually isolated power distributor grooves for operating the conducting carbon brushes (22a) which enter the conducting rails (21b), and the two conducting carbon brushes are respectively electrically connected to the conducting wires (22i) for switching on the power supply; the two conducting carbon brushes are respectively installed in a bracket (22c) of an insulation kit (22b), both ends of the bracket are provided with a slide-supporting guide rod (22d) and are respectively loaded with a compression spring (22h), the guide rod is slidingly inserted into the slide bearing (22e) and the through-hole (22j) that are fixed onto a support (22f), an operating lever (22k) is installed in the middle of the bracket with its outside end passing through the through-hole of the support and is provided with a ball-shaped handle (22l), and each of the upper and lower positioning points located on the operating lever at a certain interval has a positioning pin (22m, 22n) which is 90° from each other; and if the power switch is operated in automatic mode, the ball-shaped handle is changed to connect to a cylinder, and is connected to a secondary pressure reservoir cylinder tank with a pneumatic tube and is also electrically connected to an automatic control system (E).

6. The wind engine of claim 2, wherein the composition of the said power distributor (21) and its power switch (22) is: the power distributor (21) has an insulator ring (21a) along the outer annulus of which there are two grooves properly isolated from each other, and the two grooves each has a conducting rail (21b) in it, wherein the conducting rails are electrically connected to the conducting wires (21e), and are also electrically connected to the conducting wires (8f) of the field coil of the power generation parts brake (8); the insulator ring (21a) is slipped onto the shaft part (1e or 1f) by its central hole (21c) and fixed to the shaft part with the key groove (21d), keys and screws;

said power switch (22) has two mutually isolated power distributor grooves for operating the conducting carbon brushes (22a) which enter the conducting rails (21b), and the two conducting carbon brushes are respectively electrically connected to the conducting wires (22i) for switching on the power supply; the two conducting carbon brushes are respectively installed in a bracket (22c) of an insulation kit (22b), both ends of the bracket are provided with a slide-supporting guide rod (22d) and are respectively loaded with a compression spring (22h), the guide rod is slidingly inserted into the slide bearing (22e) and the through-hole (22j) that are fixed onto a support (22f), an operating lever (22k) is installed in the middle of the bracket with its outside end passing through the through-hole of the support and is provided with a ball-shaped handle (22l), and each of the upper and lower positioning points located on the operating lever at a certain interval has a positioning pin (22m, 22n) which is 90° from each other; and if the power switch is operated in automatic mode, the ball-shaped handle is changed to connect to a cylinder, and is connected to a secondary pressure reservoir cylinder tank with a pneumatic tube and is also electrically connected to an automatic control system (E).

7. The wind engine of claim 1, wherein said brake (8) of the power generation parts has a screw (8a) which can be inserted in a sliding fit into the integrated assembly bracket (2i) and be fixed with two (upper and lower) nuts (8b), under the screw is an enclosure (8c) whose internal space is provided with a core and field coil group (8e) which is used to generate magnetic force and is fixed with an iron piece (8d), wherein the conducting wire (8f) of the field coil is electrically connected to the conducting wire (21e) of the power distributor (21); and said opening adjustment positioner (7) of the power generation parts has a screw (7a) which is rotationably and vertically adjustable screwed onto a nut socket (7b) fixed into the integrated assembly bracket (2i) by use of a nut (7c), and the shaft part (7e) on the lower end of the screw is provided with an elastor or buffer (7d) for absorbing impact force, which can be connected by screws and fixed with a latch.

8. The wind engine of claim 3, wherein said brake (8) of the power generation parts has a screw (8a) which can be inserted in a sliding fit into the integrated assembly bracket (2i) and be fixed with two (upper and lower) nuts (8b), under the screw is an enclosure (8c) whose internal space is provided with a core and field coil group (8e) which is used to generate magnetic force and is fixed with an iron piece (8d), wherein the conducting wire (8f) of the field coil is electrically connected to the conducting wire (21e) of the power distributor (21); and said opening adjustment positioner (7) of the power generation parts has a screw (7a) which is rotationably and vertically adjustable screwed onto a nut socket (7b) fixed into the integrated assembly bracket (2i) by use of a nut (7c), and the shaft part (7e) on the lower end of the screw is provided with an elastor or buffer (7d) for absorbing impact force, which can be connected by screws and fixed with a latch.

9. A wind power system, comprising:
a support construction (B);
a higher level part (H); and
a lower level part (L);
wherein
said support construction (B) of a high frame structure or steel structure with a certain total height, total area and at least one level of space (b) to multiple levels of space (b1~bn) is formed based on the actual needs of the system, wherein said higher level part (H), i.e. the at least one level of space (b) to multiple levels of space (b1-bn) above a set height level, has a certain height and area matching the necessary height of the installed wind engine (AP);

in said lower level part (L), there is at least one to multiple floors that are installed with energy-consuming equipment for industrial production and a processing equipment (O) or a liquid pump (Q) and a pneumatic motor (M) or a turbine (J) for supplying power, and the pneumatic motor and turbine can be connected to and drives the processing equipment or liquid pump via a throttle valve (14) or a pressure regulating valve (15) or via a gear shift mechanism or a power transmission group which can control the revolution speed;

in said higher level part (H) of the said support construction (B), a group is formed by at least 3 levels of space (b), wherein the middle level is provided with an air compressor (C), a pressure reservoir cylinder tank (I), a power transmission group (10), a secondary power transmission group (10-1) and an automatic control system (E); the wind engines (AP) installed in the upper and lower levels are coupled individually by their central rotors to the power transmission group (10) or vertical drive shaft (9) installed in the middle level via a clutch (5) or a coupler (6), to form a unit of wind engines (2AP), and are also coupled to and drive their respective at least one or more air compressors (C) through at least one or more power transmission groups (10) and secondary power transmission groups (10-1) containing the clutch (5);

alternatively, in said higher level part (H) of said support construction (B), a group is formed by 5 levels of space, wherein the middle level is provided with an air compressor, a pressure reservoir cylinder tank, a power transmission group, a secondary power transmission group and the automatic control system; the upper two levels and the lower two levels are respectively installed with at least one wind engine (AP) located in the same vertical central axial line (S); the adjacent wind engines in the upper two levels and lower two levels are respectively connected in serial through the shaft part of their central rotors via a coupler or clutch, to form one unit of wind engines (2AP), and are then coupled to the vertical drive shaft (9) through a clutch or coupler to form 2 units of wind engines (4AP) with higher power output, and they are then individually coupled to and drive their respective at least one or more air compressors (C) by use of at least one or more power transmission groups and secondary power transmission groups containing a clutch;

alternatively, in the higher level part (H) of the said support construction, at least one level of space is provided with at least one wind engine (AP), and the adjacent levels are provided with an air compressor, a pressure reservoir cylinder tank, a power transmission group, a secondary power transmission group and the automatic control system (E); the wind engine is coupled to the vertical drive shaft (9) via a coupler or clutch, and is coupled to and drives their respective at least one or more air compressors (C) through at least one or more power transmission groups and secondary power transmission groups containing the clutch;

by means of piping (18) connected with a check valve (16), a gate valve (17) or a valve, the said air compressor (C) accumulates the generated high pressure compressed air in at least one or more pressure reservoir cylinder tanks (I) connected, and is also connected to a pneumatic motor (M) or turbine (J) supplying power for industrial production and processing equipment by means of piping (18) connected with a magnetic control valve (13), a throttle valve (14) and/or a pressure regulating valve (15);

combined with the automatic control system (E) installed to select and control the set functions, the system has its characteristic functions controlled as follows:

a. by adding or reducing the number of the operating air compressors (C), the wind engine (AP) or wind engines (2AP or 4AP) are adjusted so that they can maintain the normal, stable and correct operation state even when the wind is at different speeds;

b. when the natural wind speed maintains at the normal set values within certain varying range, the wind engine or wind engines (2AP or 4AP) drive the main air compressor to operate; and meanwhile, the automatic control system adjusts the high-pressure air output of the pressure reservoir cylinder tank (I) according to the operation conditions of the pneumatic motor or turbine which supplies power to the production and processing equipment (O) or liquid pump (Q) or according to the actual high-pressure air output; when the liquid pump or industrial processing equipment is stopped, the magnetic control valve or throttle valve can be used to turn off the high-pressure air output so as to stop the operation of the pneumatic motor or turbine;

c. when the wind speed changes so greatly that it exceeds the set value range or the revolution speed of the wind engine or wind engines exceeds the set normal revolution range, the automatic control system can control and select the number of air compressors to be added and put them into operation according to the change amplitude of wind speed strength or the set revolution parameter values of the wind engine so as to control and adjust the wind engine or wind engines to maintain its ideal and stable operation state under varying wind speed conditions; after an air compressor receives the command of starting operation, the clutch of the power transmission group that is coupled to it will automatically engage, the air compressor will start operation and the high-pressure air will be accumulated in the pressure reservoir cylinder tank;

d. when the wind speed or the revolution speed of the wind engine is lower than the set normal parameter range, the automatic control system will select and control the number of air compressors to be stopped according to the wind speed change or the parameter value of the revolution change range of the wind engine, and the clutch of the power transmission group of secondary power transmission group coupled to the vertical drive shaft corresponding to the air compressor receiving the stop command will disengage and stop operation immediately; and e. when the wind speed or the revolution speed of the wind engine cannot properly drive any air compressor to operate correctly, the clutch of the power transmission group coupled to the vertical drive shaft automatically disengages, and will automatically engage once the wind speed can drive the wind engine to work properly, and the power is output; and the above said is combined to become one unit of wind power system wherein there may be a plurality of units of wind power systems in the higher level part (H) of the said support construction (B).

10. The wind power system of claim 9, wherein the total height and area of the support construction (B) is planned, designed and built according to the necessary power or total power generation capacity, with the total height ranging from less than 100 m to over 100 m; the support construction is divided into two parts: the higher level part (H) that is above a certain height level, and the lower level part (L) that is below a certain height level, wherein the "certain height" refers to a height ranging from about 40 m to 100 m; for the higher level part (H), the number of levels of space (b) for installing wind engine(s) (AP), level height and area will depend upon the specifications or functional needs of the installed wind engine(s) and the height of individual levels of space range from 3 m to 30 m; for the lower level part (L), it is the base skeleton of the support construction (B) and can also be built into a usable multi-floor space and the floor height depends upon the actual applications and ranges from 3 m to 7 m; and for floors in the lower level part (L), the top one or two floors are respectively configured with a system-wide automatic monitoring & control unit (U), power transmission, distribution & supply facilities (N), system maintenance equipment and facility (V) and rest room for management and duty persons (W), and other lower floors are mainly configured with production & processing equipment (O) or economic operation facilities, and can also be planned to become a green, energy-saving and environment-friendly residence.

11. The wind power system of claim 9, wherein the higher level part (H) of the support construction (B) has levels separated by the floor (F), and at a location that is substantially centered on the floor of each level and is in the same vertical central line (S), there is a window 121(B4), and furthermore, at this location, there are also a lower mounting rack (B5) and an upper mounting rack (B6) which are used for mounting the energy wind engine (AP) and can be installed onto the beam (B2) or secondary beam;

other than the column (B1) and beam (B2) structural skeleton of the support construction (B), there is no fixed walls or other closed objects around each level of space (b) of the higher level part (H), so air can flow freely everywhere, but there is a mobile or movable divider plate or shutter door (B7) which can open/close either manually or automatically and can provide an enclosure in all four sides to block air flow or storm if necessary;

an anemometer or anemoscope (K) electrically connected to one or more automatic control systems (E) is provided on the outer side of one or more levels of space;

a dedicated large vertical elevator (T) is provided on one side of the support construction (B);

in the higher level part of the support construction, around the floors of all or lower parts (1H), there are wind collecting and directing walls (D) for collecting the wind force which extend externally to several meters or tens of meters in several directions and are constructed of light bricks or boards in combination with frame structure, and there is no floor (F) within the distribution space of the walls, wherein on the walls there may be solar photoelectric or light-heat energy conversion unit (D2) and the electric energy generated is synchronized with and output to the power transmission, distribution and supply facilities (N); a gale drainage door or window (D3) is configured near the divider plate or shutter door inside the wind collecting and directing walls;

there is a roof at the top of the topmost level of the support construction (B), which is provided with lightning protection facility and water storage tank.

12. A wind power system, comprising:

a support construction (B);

a higher level part (H); and a lower level part (L);

wherein the support construction (B) of a high frame structure or steel structure with a certain total height, total area and multiple levels of space (b1~bn) is formed based on the actual needs of the system, wherein the higher level part (H), i.e. the at least one level (b) to multiple levels of space above a set height level, has a certain height and area matching the necessary height of the installed wind engine (AP);

in the higher level part (H) of the said support construction, at least one level of space is provided with at least one wind engine (AP); in the application where each of the multiple levels of space is provided with a wind engine, and they are serially connected by the shaft part of their respective central rotor (1) to each other by means of a clutch or coupler, and are connected to the upper end of the vertical drive shaft (9) via a clutch or coupler through the wind engine at the bottom, and furthermore, the lower end of the vertical drive shaft is coupled to and drives the energy-consuming equipment of the industrial production and processing equipment (O) or liquid pump (Q) by use of the power transmission group and/or gear shift mechanism; in the meantime, they are connected to their respective at least one or more air compressors (C) by parallel connection of the vertical drive shaft to at least one or more power transmission groups and secondary power transmission groups containing the clutch;

said air compressor (C) accumulates the generated high-pressure air in at least one or more pressure reservoir cylinder tanks (I) via piping (18) connected with a check valve (16), a gate valve (17) or a valve, and is connected to the pneumatic motor (M) or turbine (J) supplying power to the industrial production and processing equipment through piping (18) connected with a magnetic control valve (13), a throttle valve (14) and/or a pressure regulating valve (15); the pneumatic motor or turbine is coupled to the power transmission group or gear shift mechanism via a clutch; and combined with the automatic control system (E) installed to control the set functions, the system is controlled as follows:

a. by adding or reducing the number of the operating air compressors (C), the wind engine (AP) or wind engines (2AP or 4AP) are controlled so that they can maintain stable and correct operation state;

b. when the natural wind speed maintains at the normal set values within certain varying range, the equipment that is powered by the wind engine or wind engines maintains the normal and ideal operation state;

c. when the wind speed increases to the extent that it exceeds the set value range or the revolution speed of the wind engine or wind engines exceeds the set range, the automatic control system can control and select the number of air compressors to be put into operation according to the wind speed strength or the set revolution parameter values of the wind engine so as to control and adjust the wind engine or wind engines to maintain their ideal and stable operation states; once an air compressor receives the command of starting operation, the clutch of the power transmission group coupled to it will automatically engage, the air compressor will start operation and the high-pressure air will be accumulated in the pressure reservoir cylinder tank; and d. when the natural wind speed or the revolution speed of the wind engine is lower than the set value range, the clutch that connects the wind engine or wind engines to the vertical drive shaft or gear shift mechanism will automatically disengage, and meanwhile the magnetic control valve connected to the pneumatic motor or turbine corresponding to the energy-consuming equipment to be operated will automatically open so that the pneumatic motor or turbine starts operation, and the clutch that connects the pneumatic motor or turbine to the gear shift mechanism or power transmission group will engage, and the power is input to the energy-consuming equipment.

13. The wind power system of claim 12, wherein the total height and area of the support construction (B) is planned, designed and built according to the necessary power or total power generation capacity, with the total height ranging from less than 100 m to over 100 m; the support construction is divided into two parts: the higher level part (H) that is above a certain height level, and the lower level part (L) that is below a certain height level, wherein the "certain height" refers to a height ranging from about 40 m to 100 m; for the higher level part (H), the number of levels of space (b) for installing wind engine(s) (AP), level height and area will depend upon the specifications or functional needs of the installed wind engine(s) and the height of individual levels of space range from 3 m to 30 m; for the lower level part (L), it is the base skeleton of the support construction (B) and can also be built into a usable multi-floor space and the floor height depends upon the actual applications and ranges from 3 m to 7 m; and for floors in the lower level part (L), the top one or two floors are respectively configured with a system-wide automatic monitoring & control unit (U), power transmission, distribution & supply facilities (N), system maintenance equipment and facility (V) and rest room for management and duty persons (W), and other lower floors are mainly configured with production & processing equipment (O) or economic operation facilities, and can also be planned to become a green, energy-saving and environment-friendly residence.

14. The wind power system of claim 12, wherein the higher level part (H) of the support construction (B) has levels separated by the floor (F), and at a location that is substantially centered on the floor of each level and is in the same vertical central line (S), there is a window 121(B4), and furthermore, at this location, there are also a lower mounting rack (B5) and an upper mounting rack (B6) which are used for mounting the energy wind engine (AP) and can be installed onto the beam (B2) or secondary beam;

other than the column (B1) and beam (B2) structural skeleton of the support construction (B), there is no fixed walls or other closed objects around each level of space (b) of the higher level part (H), so air can flow freely everywhere, but there is a mobile or movable divider plate or shutter door (B7) which can open/close either manually or automatically and can provide an enclosure in all four sides to block air flow or storm if necessary;

an anemometer or anemoscope (K) electrically connected to one or more automatic control systems (E) is provided on the outer side of one or more levels of space;

a dedicated large vertical elevator (T) is provided on one side of the support construction (B);

in the higher level part of the support construction, around the floors of all or lower parts (1H), there are wind collecting and directing walls (D) for collecting the wind force which extend externally to several meters or tens of meters in several directions and are constructed of light bricks or boards in combination with frame structure, and there is no floor (F) within the distribution space of the walls, wherein on the walls there may be solar photoelectric or light-heat energy conversion unit (D2) and the electric energy generated is synchronized with and output to the power transmission, distribution and supply facilities (N); a gale drainage door or window (D3) is configured near the divider plate or shutter door inside the wind collecting and directing walls; and there is a roof at the top of the topmost level of the support construction (B), which is provided with lightning protection facility and water storage tank.

15. A wind power generation system, comprising:

a support construction (B);
a higher level part (H); and
a lower level part (L);

wherein the support construction (B) of a high frame structure or steel structure with a certain total height, total area and at least one level (b) to multiple levels (b1~bn) of space is formed based on the actual needs of the system, wherein the higher level part (H), i.e. the at least one level (b) to multiple levels (b1~bn) of space above a set height level, has a certain height and area matching the necessary height of the installed wind engine (AP);

in the higher level part (H) of the said support construction (B), a group is formed by at least 3 levels of space (b), wherein the middle level is provided with a generator (G), an air compressor (C), a pressure reservoir cylinder tank (I), a pneumatic motor (M) or turbine (J), power transmission groups (10, 12), a secondary power transmission group (10-1) and an automatic control system (E); the floor in the upper and lower levels are respectively provided with a wind engine (AP) which is serially connected by the upper and lower shaft parts of their respective central rotors (1) to the vertical drive shaft (9) in the middle level via a clutch (5) or coupler (6), to form one unit of wind engines (2AP), and furthermore, they are connected to and drive their respective at least one or more air compressors (C) by parallel connection of the vertical drive shaft to at least one or more power transmission groups and secondary power transmission groups containing the clutch;

alternatively, in the higher level part (H) of the said support construction (B), a group is formed by 5 levels of space, wherein the middle level is provided with a generator (G), an air compressor (C), a pressure reservoir cylinder tank (I), a pneumatic motor (M) or turbine (J), power transmission groups (10, 12), a secondary power transmission group (10-1) and an automatic control system (E); the upper two levels and the lower two levels are respectively provided with at least one wind engine (AP) located in the same vertical central axial line (S); the adjacent wind engines (AP) in the upper two levels and lower two levels are serially connected via a coupler (6) or clutch (5) through the shaft parts of their central rotors (1), to respectively form one unit of wind engines (2AP), and are then coupled to the vertical drive shaft (9) in the middle level through a clutch or coupler by means of the lower shaft parts of the central rotors of the wind engines in the upper level and the upper shaft parts of the wind engines in the lower level, to form two units of wind engines (4AP) with higher power output; furthermore, they are connected in parallel to and drive their respective at least one or more air compressors (C) via at least one or more power transmission groups (10) and secondary power transmission groups (10-1) containing the clutch (5);

alternatively, in the higher level part of the said support construction, at least one level of space (b) is provided with at least one wind engine (AP), and the adjacent levels are provided with an air compressor (C), a pressure reservoir cylinder tank (I), a pneumatic motor or turbine (J), power transmission group (10, 12), a secondary power transmission group, a generator (G) and the automatic control system (E); the wind engine is coupled to the vertical drive shaft (9) via a coupler or clutch, and is also connected in parallel to and drives their respective at least one or more air compressors (C) via at least one or more power transmission groups (10) and secondary power transmission groups (10-1) containing the clutch;

through piping (18) connected with a check valve (16), a gate valve (17) or a valve, the said air compressor (C) accumulates the generated high pressure compressed air in at least one or more pressure reservoir cylinder tank (I) connected to it, and is then connected to a pneumatic motor (M) or turbine (J) through piping (18) connected with a magnetic control valve (13), a throttle valve (14) and/or a pressure regulating valve (15), and is further connected to and drives the generator (G) to generate power via the power transmission group (12) or gear shift mechanism containing the clutch (5);

the generator (G) and the wind engine (AP) are provided with a revolution sensor, all pressure reservoir cylinder tanks (I) or their piping is provided with a pressure sensor, and both the sensors are electrically connected to the automatic control system (E);

combined with the automatic control system (E) installed to control, select and adjust the set functions, the system has its characteristic functions controlled and regulated as follows:

a. by adding or reducing the number of the operating air compressors (C), the wind engine (AP) or wind engines (2AP or 4AP) is controlled to maintain the stable and correct operation state;

b. when the natural wind speed or the revolution speed of the wind engine (AP) or wind engines (2AP or 4AP) maintains within the set normal optimal value range, the main air compressor (C) or a necessary number of air compressors is put into operation, the high-pressure air accumulates in the pressure reservoir cylinder tanks (I), and the energy it generates is more than the energy consumed by the pneumatic motor (M) or turbine (J); the pressure reservoir cylinder tanks that are full of high-pressure air of the said air compressor are connected, wherein the pressure reservoir cylinder tank which receives the command to open the valves (13, 14 and/or 15) outputs stably-regulated high-pressure air through the piping (18) connected with a control valve to drive the pneumatic motor (M) or turbine (J) to operate and drive the generator (G) to work stably to generate and output high-quality power;

c. when the wind speed changes so greatly that it exceeds the set normal value range or the revolution speed of the wind engine or wind engines exceeds the set normal revolution range, the automatic control system can control and select the number of air compressors to be put into operation according to the change amplitude of the wind speed strength or the set revolution parameter values of the wind engine or wind engines to control and adjust the wind engine (AP) or wind engines (2AP or 4AP) and the generator (G) to maintain their correct and stable operation states; once an air compressor receives the command of starting operation, the clutch (5) of the secondary power transmission group (10-1) that connects to it will automatically engage, and power is transmitted to drive the air compressor to start operation and the high-pressure air will be accumulated in the pressure reservoir cylinder tank (I); and d. when the wind speed decreases to lower than the set value range or the revolution speed of the wind engine is lower than the set normal value range, the automatic control system will select the number of air compressors to be stopped according to the set wind speed or the parameters of the revolution change range of the wind engine, so as to maintain normal operation of the wind engine or wind engines and air compressor; the clutch of the corresponding power transmission group coupled to the air compressor which receives the control command to stop operation will automatically disengage and the air compressor stops operation; if the wind engine or wind engines are in operation but without efficiency, the clutch (5) of the power transmission group (10) coupled to the vertical drive shaft (9) will automatically disengage and will engage again once the wind speed returns to normal, and the wind engine and the air compressor will continue normal operation; in case of stop of the wind engine and air compressor due to no wind or weak wind, the generator can still be stably driven to operate and generate power by the pneumatic motor or turbine whose power is supplied by the air pressure reservoir cylinder tank with sufficient high-pressure air; and said forming one unit of wind power generation system may comprise setting many units of wind power generation systems in the higher level part (H) of the said support construction (B) to output and supply power in combination with the power distribution and supply facilities (N).

16. The wind power generation system of claim 15, wherein the total height and area of the support construction (B) is planned, designed and built according to the necessary power or total power generation capacity, with the total height ranging from less than 100 m to over 100 m; the support construction is divided into two parts: the higher level part (H) that is above a certain height level, and the lower level part (L) that is below a certain height level, wherein the "certain height" refers to a height ranging from about 40 m to 100 m; for the higher level part (H), the number of levels of space (b) for installing wind engine(s) (AP), level height and area will depend upon the specifications or functional needs of the installed wind engine(s) and the height of individual levels of space range from 3 m to 30 m; for the lower level part (L), it is the base skeleton of the support construction (B) and can also be built into a usable multi-floor space and the floor height depends upon the actual applications and ranges from 3 m to 7 m; and for floors in the lower level part (L), the top one or two floors are respectively configured with a system-wide automatic monitoring & control unit (U), power transmission, distribution & supply facilities (N), system maintenance equipment and facility (V) and rest room for management and duty persons (W), and other lower floors are mainly configured with production & processing equipment (O) or economic operation facilities, and can also be planned to become a green, energy-saving and environment-friendly residence.

17. The wind power generation system of claim 15, wherein the higher level part (H) of the support construction (B) has levels separated by the floor (F), and at a location that is substantially centered on the floor of each level and is in the same vertical central line (S), there is a window 121(B4), and furthermore, at this location, there are also a lower mounting rack (B5) and an upper mounting rack (B6) which are used for mounting the energy wind engine (AP) and can be installed onto the beam (B2) or secondary beam;

other than the column (B1) and beam (B2) structural skeleton of the support construction (B), there is no fixed walls or other closed objects around each level of space (b) of the higher level part (H), so air can flow freely everywhere, but there is a mobile or movable divider plate or shutter door (B7) which can open/close either manually or automatically and can provide an enclosure in all four sides to block air flow or storm if necessary;

an anemometer or anemoscope (K) electrically connected to one or more automatic control systems (E) is provided on the outer side of one or more levels of space;

a dedicated large vertical elevator (T) is provided on one side of the support construction (B);

in the higher level part of the support construction, around the floors of all or lower parts (1H), there are wind collecting and directing walls (D) for collecting the wind force which extend externally to several meters or tens of meters in several directions and are constructed of light bricks or boards in combination with frame structure, and there is no floor (F) within the distribution space of the walls, wherein on the walls there may be solar photoelectric or light-heat energy conversion unit (D2) and the electric energy generated is synchronized with and output to the power transmission, distribution and supply facilities (N); a gale drainage door or window (D3) is configured near the divider plate or shutter door inside the wind collecting and directing walls; and there is a roof at the top of the topmost level of the support construction (B), which is provided with lightning protection facility and water storage tank.

18. A wind power generation system, comprising:

a support construction (B);

a higher level part (H); and a lower level part (L);

wherein a support construction (B) of a high frame structure or steel structure with a certain total height, total area and at least one level of space (b) to multiple levels of space (b1~bn) is formed based on the actual needs of the system and can be divided into the higher level part (H) above a set height level and the lower level part (L) below a certain height level; wherein, the at least one level to multiple levels of space in the higher level part (H) has a certain height and area matching the necessary height of the installed wind engine (AP);

in the higher level part (H) of the said support construction (B), a group is formed by at least 3 levels of space (b), wherein the middle level is provided with a generator (G), an air compressor (C), an air pressure reservoir cylinder tank (I), a pneumatic motor (M) or turbine (J), power transmission groups (10, 11, 12), a secondary power transmission group (10-1) and an automatic control system (E); the space in the upper and lower levels are respectively provided with a wind engine (AP) which is connected to the vertical drive shaft (9) or power transmission group in the middle level via a clutch (5) or coupler (6) to form one unit of wind engines (2AP), and is coupled to and drives the generator (G) by means of the power transmission group (11) containing the clutch (5), and is also connected in parallel to and drives if necessary their respective at least one or more air compressors (C) via at least one or more power transmission groups (10) and secondary power transmission groups (10-1) containing the clutch (5);

alternatively, in the higher level part (H) of the said support construction (B), a group is formed by 5 levels of space (b), wherein the middle level of which is provided with a generator (G), an air compressor (C), an air pressure reservoir cylinder tank (I), a pneumatic motor (M) or turbine (J), power transmission groups (10, 11, 12), a secondary power transmission group and an automatic control system (E); the upper two levels and the lower two levels are respectively installed with at least one wind engine (AP) located in the same vertical central axial line (S); the adjacent wind engines in the upper two levels and lower two levels are serially connected by the shaft parts of their central rotors (1) via a coupler or clutch to respectively form one unit of wind engines (2AP), and are then serially connected to the vertical drive shaft (9) through a clutch or coupler to form two units of wind engines (4AP) with higher power output, and are further connected in parallel to their respective at least one or more air compressors (C) through at least one or more power transmission groups (10) and secondary power transmission groups (10-1) containing the clutch, and drive the operation if necessary and accumulate high-pressure air in the air pressure reservoir cylinder tanks (I);

alternatively, in the higher level part (H) of the said support construction (B), there is at least one level space that is provided with at least one wind engine (AP), and the adjacent level is provided with a generator (G), an air compressor (C), an air pressure reservoir cylinder tank (I), power transmission groups (10,11,12), a secondary power transmission group (10-1) and an automatic control system (E), wherein the wind engines are coupled to and drive the motor via a clutch (5) or coupler (6) and a vertical drive shaft (9) or power transmission group, and furthermore, they are connected in parallel to and drive if necessary their respective at least one or more air compressors (C) via at least one or more power transmission groups (10) and secondary power transmission groups (10-1) including the clutch;

the above-mentioned motor and wind engine are provided with a revolutions sensor and is electrically connected to the automatic control system;

the above-mentioned air compressors respectively accumulate the generated compressed air into at least one or more air pressure reservoir cylinder tank by means of a pipeline with a check valve, a gate valve or a valve, are connected to the pneumatic motor or turbine via a pipeline with a magnetic control valve, a throttle valve or/and a pressure regulating valve, and furthermore, if necessary they also receive commands from the automatic control system to be connected to and drive the generator to operate and generate power by means of the power transmission group (12) including the clutch; each air pressure reservoir cylinder tank or pipeline can also be provided with a pressure sensor and electrically connected to the automatic control system;

combined with the automatic control system (E) installed to control, select and adjust the set functions, the system has its functions controlled as follows:

a. by adding or reducing the number of the operating air compressors (C), the wind engine (AP) or wind engines (2AP or 4AP) are controlled so that they can maintain normal, stable and correct operation states even at different wind speeds;

b. when the wind speed or the revolution speed of the wind engine maintains within the set normal value range, the wind engine or the wind engines (2AP or 4AP) drive the generator (G) to operate and generate power;

c. when the wind speed is so high that it exceeds the set value range or the revolution speed of the wind engine or generator exceeds the set normal revolution range, the automatic control system can control and select to start one, two or more air compressors according to the wind speed strength or the set parameter value of the revolution change amplitude of the wind engine or generator so as to control and adjust the wind engine or generator to maintain their correct and stable operation state; once an air compressor receives the command of starting operation, the clutch of the power transmission group (10) coupled to it will automatically engage, the corresponding air compressor will start operation and the high-pressure air will be accumulated in the air pressure reservoir cylinder tanks (I);

d. when the wind speed decreases to lower than the set value range or the revolution speed of the wind engine or engines or generator is lower than the set value range, the clutch (5) that connects the wind engine or engines to the power transmission group (11) of the generator will automatically disengage, and meanwhile, among the air pressure reservoir cylinder tanks (I) full of high-pressure compressed air indicated by the pressure sensor, the magnetic control valve (13) of the air pressure reservoir cylinder tank which receives the command to output high-pressure air will open and the high-pressure air flow is adjusted by the throttle valve (14) and/or pressure regulating valve (15) to achieve a proper flow and/or pressure so as to control the output power of the pneumatic motor (M) or turbine, and in the meantime, the clutch (5) of the power transmission group (12) connected to the pneumatic motor or turbine and generator (G) will automatically engage and the power output is maintained to drive the generator to continue operation, and to generate and output power; and e. when the wind speed returns to the set normal value range, the clutch of the power transmission group (11) will receive a command and will automatically engage, and meanwhile, the clutch of the power transmission group (12) is controlled to disengage, the magnetic control valve will receive a command and will automatically close so that the high-pressure air output is stopped, and the pneumatic motor or turbine stops operation, and the generator is driven to operate and generate power again by the wind engine or engines; and the above said is combined to become one unit of wind power generation system wherein there may be a plurality of units of wind power generation systems in the higher level part (H) of the said support construction (B) and they transmit and supply power in combination with the power distribution and supply facilities (N).

19. The wind power generation system of claim 18, wherein the total height and area of the support construction (B) is planned, designed and built according to the necessary power or total power generation capacity, with the total height ranging from less than 100 m to over 100 m; the support construction is divided into two parts: the higher level part (H) that is above a certain height level, and the lower level part (L) that is below a certain height level, wherein the "certain height" refers to a height ranging from about 40 m to 100 m; for the higher level part (H), the number of levels of space (b) for installing wind engine(s) (AP), level height and area will depend upon the specifications or functional needs of the installed wind engine(s) and the height of individual levels of space range from 3 m to 30 m; for the lower level part (L), it is the base skeleton of the support construction (B) and can also be built into a usable multi-floor space and the floor height depends upon the actual applications and ranges from 3 m to 7 m;

for floors in the lower level part (L), the top one or two floors are respectively configured with a system-wide automatic monitoring & control unit (U), power transmission, distribution & supply facilities (N), system maintenance equipment and facility (V) and rest room for management and duty persons (W), and other lower floors are mainly configured with production & processing equipment (O) or economic operation facilities, and can also be planned to become a green, energy-saving and environment-friendly residence.

20. The wind power generation system of claim 18, wherein the higher level part (H) of the support construction (B) has levels separated by the floor (F), and at a location that is substantially centered on the floor of each level and is in the same vertical central line (S), there is a window 121(B4), and furthermore, at this location, there are also a lower mounting rack (B5) and an upper mounting rack (B6) which are used for mounting the energy wind engine (AP) and can be installed onto the beam (B2) or secondary beam;

other than the column (B1) and beam (B2) structural skeleton of the support construction (B), there is no fixed walls or other closed objects around each level of space (b) of the higher level part (H), so air can flow freely everywhere, but there is a mobile or movable divider plate or shutter door (B7) which can open/close either manually or automatically and can provide an enclosure in all four sides to block air flow or storm if necessary;

an anemometer or anemoscope (K) electrically connected to one or more automatic control systems (E) is provided on the outer side of one or more levels of space;

a dedicated large vertical elevator (T) is provided on one side of the support construction (B);

in the higher level part of the support construction, around the floors of all or lower parts (1H), there are wind collecting and directing walls (D) for collecting the wind force which extend externally to several meters or tens of meters in several directions and are constructed of light bricks or boards in combination with frame structure, and there is no floor (F) within the distribution space of the walls, wherein on the walls there may be solar photoelectric or light-heat energy conversion unit (D2) and the electric energy generated is synchronized with and output to the power transmission, distribution and supply facilities (N); a gale drainage door or window (D3) is configured near the divider plate or shutter door inside the wind collecting and directing walls; and there is a roof at the top of the topmost level of the support construction (B), which is provided with lightning protection facility and water storage tank.

* * * * *